(12) United States Patent
Farber et al.

(10) Patent No.: US 7,962,572 B1
(45) Date of Patent: *Jun. 14, 2011

(54) SYSTEMS AND METHODS FOR PROVIDING AN ON-DEMAND ENTERTAINMENT SERVICE

(75) Inventors: Stuart H. Farber, Horsham, PA (US); Ronald M. Yurman, Short Hills, NJ (US); Jeremy C. Rosenberg, Havre de Grace, MD (US); Robert M. Steinberg, Horsham, PA (US); John J. Feras, Jr., North Wales, PA (US); Daniel L. McGonigal, Lexington, PA (US); Donna M. O'Neill, Ambler, PA (US); Christina B. Tancredi, Ambler, PA (US); David J. Del Beccaro, Jenkintown, PA (US)

(73) Assignee: Music Choice, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/605,580

(22) Filed: Oct. 26, 2009

Related U.S. Application Data

(63) Continuation of application No. 11/002,205, filed on Dec. 3, 2004, now Pat. No. 7,617,295, which is a continuation-in-part of application No. 10/339,425, filed on Jan. 9, 2003, now Pat. No. 7,325,043, and a continuation-in-part of application No. 10/098,620, filed on Mar. 18, 2002, now Pat. No. 7,783,722.

(60) Provisional application No. 60/390,312, filed on Jun. 21, 2002, provisional application No. 60/395,360, filed on Jul. 12, 2002, provisional application No. 60/612,618, filed on Sep. 24, 2004.

(51) Int. Cl.
    *G06F 15/16* (2006.01)

(52) U.S. Cl. .......... 709/217; 709/201; 709/203; 725/37; 725/46; 725/47; 725/86; 725/87; 725/105; 725/143

(58) Field of Classification Search .................. 709/217, 709/203–206; 725/37, 46, 86, 87, 105, 143
    See application file for complete search history.

(56) References Cited

U.S. PATENT DOCUMENTS

| | | | |
|---|---|---|---|
| 4,127,796 | A | 11/1978 | Henderson |
| RE29,997 | E | 5/1979 | den Toonder |
| 4,336,478 | A | 6/1982 | Quilty et al. |
| 4,338,623 | A | 7/1982 | Asmus et al. |

(Continued)

FOREIGN PATENT DOCUMENTS

EP  1 022 900 A1  7/2000

(Continued)

OTHER PUBLICATIONS

AudioRequest, MP3 Home Stereo Jukebox, ReQuest, Inc.—Company Info., and NSI-WHOIS Search Results. Pages from the web site for www.request.com owned by ReQuest, Inc.

(Continued)

*Primary Examiner* — Carl Colin
*Assistant Examiner* — Mohammad Siddiqi
(74) *Attorney, Agent, or Firm* — Rothwell, Figg, Ernst & Manbeck, P.C.

(57) ABSTRACT

The present invention provides systems and methods for, in some cases, supplementing a broadcast media service with an on-demand service.

26 Claims, 22 Drawing Sheets

U.S. PATENT DOCUMENTS

| | | |
|---|---|---|
| 4,360,805 A | 11/1982 | Andrews et al. |
| 4,677,430 A | 6/1987 | Falkman et al. |
| 4,722,005 A | 1/1988 | Ledenbach |
| 4,760,455 A | 7/1988 | Nagashima |
| 4,799,156 A | 1/1989 | Shavit et al. |
| 4,823,386 A | 4/1989 | Dumbauld |
| 5,130,615 A | 7/1992 | George |
| 5,193,006 A | 3/1993 | Yamazaki |
| 5,341,350 A | 8/1994 | Frank et al. |
| 5,355,302 A | 10/1994 | Martin et al. |
| 5,365,381 A | 11/1994 | Scheffler |
| 5,371,551 A | 12/1994 | Logan et al. |
| 5,418,654 A | 5/1995 | Scheffler |
| 5,481,296 A | 1/1996 | Cragun et al. |
| 5,534,911 A | 7/1996 | Levitan |
| 5,550,863 A | 8/1996 | Yurt et al. |
| 5,557,541 A | 9/1996 | Schulhof et al. |
| 5,572,442 A | 11/1996 | Schulhof et al. |
| 5,585,866 A | 12/1996 | Miller et al. |
| 5,590,282 A | 12/1996 | Clynes |
| 5,592,511 A | 1/1997 | Schoen et al. |
| 5,616,876 A | 4/1997 | Cluts |
| 5,617,565 A | 4/1997 | Augenbraun et al. |
| 5,629,867 A | 5/1997 | Goldman |
| 5,635,989 A | 6/1997 | Rothmuller |
| 5,636,276 A | 6/1997 | Brugger |
| 5,646,992 A | 7/1997 | Subler |
| 5,675,734 A | 10/1997 | Hair |
| 5,708,780 A | 1/1998 | Levergood et al. |
| 5,835,487 A | 1/1998 | Campanella |
| 5,721,815 A | 2/1998 | Ottesen et al. |
| 5,726,909 A | 3/1998 | Krikorian |
| 5,734,719 A | 3/1998 | Tsevdos et al. |
| 5,734,961 A | 3/1998 | Castille |
| 5,751,282 A | 5/1998 | Girard et al. |
| 5,751,806 A | 5/1998 | Ryan |
| 5,753,844 A | 5/1998 | Matsumoto |
| 5,754,939 A | 5/1998 | Herz et al. |
| 5,761,606 A | 6/1998 | Wolzien |
| 5,761,607 A | 6/1998 | Gudesen |
| 5,761,662 A | 6/1998 | Dasan |
| 5,771,435 A | 6/1998 | Brown |
| 5,961,662 A | 6/1998 | Dasan |
| 5,781,889 A | 7/1998 | Martin et al. |
| 5,784,595 A | 7/1998 | Robbins et al. |
| 5,790,935 A | 8/1998 | Payton |
| 5,793,980 A | 8/1998 | Glaser et al. |
| 5,809,246 A | 9/1998 | Goldman |
| 5,819,049 A | 10/1998 | Rietmann |
| 5,819,160 A | 10/1998 | Foladare et al. |
| 5,841,979 A | 11/1998 | Schulhof et al. |
| 5,848,398 A | 12/1998 | Martin et al. |
| 5,861,906 A | 1/1999 | Dunn et al. |
| 5,909,144 A | 3/1999 | Sirbu et al. |
| 5,878,141 A | 3/1999 | Daly et al. |
| 5,890,137 A | 3/1999 | Koreeda |
| 5,890,139 A | 3/1999 | Suzuki et al. |
| 5,899,699 A | 5/1999 | Kamiya |
| 5,899,980 A | 5/1999 | Wilf et al. |
| 5,900,830 A | 5/1999 | Scheffler |
| 5,913,204 A | 6/1999 | Kelly |
| 5,918,213 A | 6/1999 | Bernard et al. |
| 5,926,624 A | 7/1999 | Katz et al. |
| 5,930,765 A | 7/1999 | Martin et al. |
| 5,930,768 A | 7/1999 | Hooban |
| 5,931,901 A | 8/1999 | Wolfe et al. |
| 5,933,500 A | 8/1999 | Blatter et al. |
| 5,943,422 A | 8/1999 | Van Wie et al. |
| 5,944,608 A | 8/1999 | Reed et al. |
| 5,959,945 A | 9/1999 | Kleiman |
| 5,960,411 A | 9/1999 | Hartman et al. |
| 5,968,120 A | 10/1999 | Guedalia |
| 5,969,283 A | 10/1999 | Looney et al. |
| 5,970,474 A | 10/1999 | LeRoy et al. |
| 5,973,722 A | 10/1999 | Wakai et al. |
| 5,980,261 A | 11/1999 | Mino et al. |
| 5,986,692 A | 11/1999 | Logan et al. |
| 5,991,374 A | 11/1999 | Hazenfield |
| 5,991,737 A | 11/1999 | Chen |
| 6,011,761 A | 1/2000 | Inoue |
| 6,011,854 A | 1/2000 | Van Ryzin |
| 6,020,883 A | 2/2000 | Herz et al. |
| 6,021,432 A | 2/2000 | Sizer et al. |
| 6,025,868 A | 2/2000 | Russo |
| 6,038,591 A | 3/2000 | Wolfe et al. |
| 6,055,314 A | 4/2000 | Spies et al. |
| 6,055,566 A | 4/2000 | Kikinis |
| 6,085,235 A | 7/2000 | Clarke et al. |
| 6,088,455 A | 7/2000 | Logan et al. |
| 6,088,722 A | 7/2000 | Herz et al. |
| 6,105,060 A | 8/2000 | Rothblatt |
| 6,135,646 A | 10/2000 | Kahn et al. |
| 6,151,634 A | 11/2000 | Glaser et al. |
| 6,154,772 A | 11/2000 | Dunn et al. |
| 6,161,142 A | 12/2000 | Wolfe et al. |
| 6,192,340 B1 | 2/2001 | Abecassis |
| 6,223,292 B1 | 4/2001 | Dean et al. |
| 6,226,030 B1 | 5/2001 | Harvey et al. |
| 6,226,618 B1 | 5/2001 | Downs et al. |
| 6,229,895 B1 | 5/2001 | Son et al. |
| 6,232,539 B1 | 5/2001 | Looney et al. |
| 6,233,682 B1 | 5/2001 | Fritsch |
| 6,240,553 B1 | 5/2001 | Son et al. |
| 6,243,725 B1 | 6/2001 | Hempleman et al. |
| 6,246,672 B1 | 6/2001 | Lumelsky |
| 6,248,946 B1 | 6/2001 | Dwek |
| 6,249,810 B1 | 6/2001 | Kiraly |
| 6,253,235 B1 | 6/2001 | Estes |
| 6,253,237 B1 | 6/2001 | Story et al. |
| 6,262,772 B1 | 7/2001 | Shen et al. |
| 6,279,040 B1 | 8/2001 | Ma et al. |
| 6,286,139 B1 | 9/2001 | Decinque |
| 6,305,020 B1 | 10/2001 | Hoarty et al. |
| 6,324,217 B1 | 11/2001 | Gordon |
| 6,330,595 B1 | 12/2001 | Ullman et al. |
| 6,330,609 B1 | 12/2001 | Garofalakis et al. |
| 6,338,044 B1 | 1/2002 | Cook et al. |
| 6,369,851 B1 | 4/2002 | Marflak et al. |
| 6,389,467 B1 | 5/2002 | Eyal |
| 6,418,421 B1 | 7/2002 | Hurtado et al. |
| 6,434,747 B1 | 8/2002 | Khoo et al. |
| 6,445,306 B1 | 9/2002 | Trovato |
| 6,446,130 B1 | 9/2002 | Grapes |
| 6,490,728 B1 | 12/2002 | Kitazato et al. |
| 6,505,240 B1 | 1/2003 | Blumenau |
| 6,526,411 B1 | 2/2003 | Ward |
| 6,550,011 B1 | 4/2003 | Sims, III |
| 6,587,127 B1 | 7/2003 | Leeke et al. |
| 6,587,837 B1 | 7/2003 | Spagna et al. |
| 6,748,427 B2 | 6/2004 | Drosset et al. |
| 6,766,357 B1 | 7/2004 | Fandozzi |
| 6,782,550 B1 * | 8/2004 | Cao ............................... 725/39 |
| 6,789,106 B2 | 9/2004 | Eyer |
| 6,842,604 B1 | 1/2005 | Cooke |
| 6,865,550 B1 | 3/2005 | Cok |
| 6,898,800 B2 | 5/2005 | Son et al. |
| 6,925,489 B1 | 8/2005 | Curtin |
| 6,933,433 B1 | 8/2005 | Porteus et al. |
| 7,020,888 B2 | 3/2006 | Reynolds et al. |
| 7,028,082 B1 | 4/2006 | Rosenberg et al. |
| 7,065,287 B1 | 6/2006 | Heredia et al. |
| 7,076,561 B1 | 7/2006 | Rosenberg et al. |
| 7,133,924 B1 | 11/2006 | Rosenberg et al. |
| 7,149,471 B1 | 12/2006 | Arisawa et al. |
| 7,155,674 B2 | 12/2006 | Breen et al. |
| 7,321,923 B1 | 1/2008 | Rosenberg et al. |
| 7,325,043 B1 | 1/2008 | Rosenberg et al. |
| 7,617,295 B1 * | 11/2009 | Farber et al. ................... 709/217 |
| 7,735,106 B2 * | 6/2010 | LaRocca et al. ................ 725/87 |
| 2001/0032312 A1 | 10/2001 | Runje et al. |
| 2001/0042107 A1 | 11/2001 | Palm |
| 2001/0049826 A1 | 12/2001 | Wilf |
| 2002/0021708 A1 | 2/2002 | Ishiai |
| 2002/0023164 A1 | 2/2002 | Lahr |
| 2002/0023166 A1 | 2/2002 | Bar-Noy et al. |
| 2002/0032728 A1 | 3/2002 | Sako et al. |
| 2002/0038359 A1 | 3/2002 | Ihara et al. |

| | | | |
|---|---|---|---|
| 2002/0046084 | A1 | 4/2002 | Steele et al. |
| 2002/0056117 | A1 | 5/2002 | Hasegawa et al. |
| 2002/0056118 | A1 | 5/2002 | Hunter et al. |
| 2002/0059621 | A1 | 5/2002 | Thomas et al. |
| 2002/0062261 | A1 | 5/2002 | Mukai |
| 2002/0083148 | A1 | 6/2002 | Shaw et al. |
| 2002/0138630 | A1 | 9/2002 | Solomon et al. |
| 2002/0152278 | A1 | 10/2002 | Pontenzone et al. |
| 2002/0194260 | A1 | 12/2002 | Headley et al. |
| 2002/0194619 | A1 | 12/2002 | Chang et al. |
| 2003/0023975 | A1 | 1/2003 | Schrader et al. |
| 2003/0050058 | A1 | 3/2003 | Walsh et al. |
| 2003/0097338 | A1 | 5/2003 | Mankovich et al. |
| 2003/0126595 | A1 | 7/2003 | Sie |
| 2003/0135464 | A1 | 7/2003 | Mourad et al. |
| 2003/0182184 | A1 | 9/2003 | Strasnick et al. |
| 2006/0173974 | A1 | 8/2006 | Tang |

FOREIGN PATENT DOCUMENTS

| | | |
|---|---|---|
| WO | WO 01/36064 | 5/2001 |

OTHER PUBLICATIONS

Six pages from the web site for www.sonicnet.com.

ntl: Digital Radio. http://www.ntl.com/locales/gb/en/guides/dummies/produce.asp.

Deutsche Telekom AG: Digital Radio. http://www.telekom.de/dtag/ip11/cda/level3_a/0,3680,10077,00.html.

The Eureka 147 Consortium. "Digital Audio Broadcasting" http://www.eureadab.org/eureka_147_consortium.htm.

Notice of Allowability from U.S. Appl. No. 11/002,181.

Office Action issued on Mar. 16, 2005 in U.S. Appl. No. 09/800,956, 20 pp.

Office Action issued on May 24, 2005 in U.S. Appl. No. 10/098,482, 10 pp.

Office Action issued on Feb. 15, 2006 in U.S. Appl. No. 10/098,482, 12 pp.

Office Action issued on Apr. 18, 2006 in U.S. Appl. No. 10/098,482, 3 pp.

Office Action issued on Nov. 21, 2006 in U.S. Appl. No. 10/098,482, 11 pp.

Office Action issued on Aug. 30, 2005 in U.S. Appl. No. 10/098,473, 8 pp.

Office Action issued on Aug. 30, 2005 in U.S. Appl. No. 10/098,450, 8 pp.

Office Action issued on Mar. 13, 2007 in U.S. Appl. No. 10/339,425, 13 pp.

Office Action issued on Aug. 29, 2006 in U.S. Appl. No. 10/339,425, 19 pp.

Office Action issued on Dec. 6, 2006 in U.S. Appl. No. 11/002,181, 10 pp.

Office Action issued on Jun. 8, 2007 in U.S. Appl. No. 11/002,181, 13 pp.

Office Action issued on Aug. 23, 2005 in U.S. Appl. No. 10/098,620, 15 pp.

Office Action issued on Jun. 15, 2006 in U.S. Appl. No. 10/098,620, 14 pp.

Office Action issued on Apr. 4, 2007 in U.S. Appl. No. 10/098,620, 12 pp.

Clark D. (2000). "Click Radio to put a DJ in your PC." WSJ Interactive Edition.

ClickRadio granted first interactive radio license by universal music group. 3 pages. From the web site at www.clickradio.com, printed Apr. 26, 2000.

Gordon, C. (2000). "Click radio sidesteps competition with music licensing deals." Atnewyork.com.

Press Release. (Dec. 13, 2000). "Phillips showcases click radio on digital set-top at western show 2000." Phillips.

Bower (1998). "Digital Radio—A Revolution for In-Car Entertainment" Proc. NavPos Automative '98 Conf. 2(5-8): 40-51.

Radio Authority (1999). Digital Radio Fact Sheet No. 4 http://www.radioauthority.org.uk/Information/Fact_Sheets/fs4.htm.

ICTV (2000). Digital Broadband System Press Release: 1-11.

Loeb, S., "Architecting Personalized Delivery of Multimedia Information", Communications of the ACM, Dec. 1992, vol. 35, No. 12, pp. 39-48.

* cited by examiner

SYSTEMS AND METHODS FOR PROVIDING AN ON-DEMAND ENTERTAINMENT SERVICE

CROSS-REFERENCE TO RELATED APPLICATIONS

This application is a continuation of U.S. patent application Ser. No. 11/002,205, filed Dec. 3, 2004 (now U.S. Pat. No. 7,617,295), which is a continuation-in-part of U.S. patent application Ser. No. 10/339,425, filed on Jan. 9, 2003 (now U.S. Pat. No. 7,325,043), which claims the benefit of U.S. Provisional Patent Application No. 60/390,312 (filed Jun. 21, 2002) and U.S. Provisional Patent Application No. 60/395, 360 (filed Jul. 12, 2002) and which is a continuation-in-part of U.S. patent application Ser. No. 10/098,620, filed Mar. 18, 2002 (now U.S. Pat. No. 7,783,722); this application also claims the benefit of U.S. Provisional Patent Application No. 60/612,618, filed Sep. 24, 2004. All of the above referenced applications and patents are incorporated herein by this reference.

BACKGROUND OF THE INVENTION

1. Field of the Invention

This invention is related to entertainment and information system, and, more specifically, to broadcast, on-demand and/or personalized entertainment and information systems.

2. Discussion of the Background

Broadcasters, such as music broadcasters (e.g., conventional radio stations and other broadcasters of music, video or multimedia works) must accommodate the tastes of a mass audience, and, as we all know, it is not possible to please all of the people all of the time; we each have our own unique likes and dislikes. Consequently, a broadcaster at times may broadcast content that one or more members of the audience may not prefer to consume.

One solution to this problem is to increase the number of radio stations and/or the number of cable stations that carry music, and thereby increase the likelihood that a listener will find a station that is playing a "good" song. However, this is not a practical solution because there is only a finite amount of bandwidth available to broadcast music, and this bandwidth is already at or near capacity. Further, it is prohibitively expensive to create additional broadcast bandwidth.

SUMMARY OF THE INVENTION

The present invention provides, among other things, systems and methods for supplementing a broadcast media service with an on-demand and personalized media service. An on-demand media service is a service that enables a user to select the precise content (e.g., music, video or other content) and/or type of content (e.g., genre and sub-genre) that is transmitted by the service provider to the user, when a user desires such content. A personalized media service is a service that allows a user to have at least some degree of control over the content that is transmitted by the service provider to the user.

In one aspect, the present invention provides a system for providing an on-demand, personalized and a broadcast service to a plurality of users. In one embodiment, the system includes: a broadcast media source for broadcasting a signal including plurality of broadcast media channels, wherein each broadcast channel is associated with a format; a distribution center including: a signal receiver system that receives the broadcast signal, an on-demand system, and a transmission system that (a) combines an output from the on-demand system with an output from the signal receiver system to create a combined signal that includes the plurality of broadcast media channels and (b) transmits the combined signal to a plurality of client systems via a distribution network.

Preferably, the client systems are operable to (1) isolate at least one of the channels within the combined signal, (2) provide audio data included in the isolated channel to an audio system that reproduces the audio for a user of the client system to hear, (3) provide video data included in the isolated channel to a video system that displays the video data on a display device for the user to see, (4) provide graphical data included in the isolated channel to a video system that displays the graphical data on a display device for the user to see, (5) display a user selectable button on the display device so that the user selectable button is displayed on the display device together with the video data, and (6) in response to the user of the client system selecting the selectable button, communicate with the on-demand system to initiate an on-demand session.

In some embodiments, in response to the user of the client system selecting the selectable button, the client system transmits information to the on-demand system, and, in response thereto, the on-demand system transmits a list of music videos to the client system.

The client system preferably displays the list of music videos on the display device so that the user is able to select one or more of the listed videos. In response to the user selecting one or more of the listed videos, the client system transmits to the on-demand system information identifying the music videos selected by the user. After receiving the information identifying the music videos selected by the user, the on-demand system creates a playlist of media assets. After creating the playlist, the on-demand system transmits to the client system, one at a time, the media assets included in the playlist. Preferably, for each video selected by the user there is a corresponding media asset in the playlist. Additionally, zero or more of the media assets included in the playlist may include commercial elements, promotional messages, etc.

In other embodiments, in response to the user of the client system selecting the selectable button, the client system transmits to the on-demand system information identifying the user and/or the client system, and, in response thereto, the on-demand system determines whether there is included in a set of channel profiles one or more channel profiles associated with the user and/or the client system.

If there is included in the set of channel profiles one or more channel profiles associated with the user and/or the client system, then the on-demand system may transmit to the client system a list of the one or more channel profiles. The client system may display the list to the user and the user is able to select one of the listed channel profiles. In response to the user selecting a channel profile, the client system may transmit to the on-demand system information identifying the channel profile selected by the user.

After receiving the information identifying the channel profile selected by the user, the on-demand system may select one or more media assets that match the selected channel profile, establish an on-demand session with the client system, and, after establishing the on-demand session, transmit to the client system the selected media asset(s). In some embodiments, the process of selecting additional media assets and then transmitting those assets to the client system may continue for a predetermined or indefinite period of time. In this way, the system may provide a personalized entertainment system. Advantageously, in some embodiments, one or more of the selected media assets include commercial elements, promotional message, etc. For example, a selected media asset may be a short (e.g., 30 second) video advertisement.

In another aspect, the present invention provides a method for providing an on-demand service to a user of a client system having a display. In one embodiment, the method includes the steps of: displaying to the user on the display a user interface comprising a button associated with an on-demand service; in response to the user activating the button, transmitting information to an on-demand system, wherein the information includes information associated with the activated button; receiving at the on-demand system the transmitted information; creating a playlist of media assets after receiving the transmitted information, wherein the playlist includes a first media asset and a second media asset; establishing an on-demand session with the client system after receiving the transmitted information; transmitting from the on-demand system to the client system the first media asset; reproducing the first media asset at the client system; transmitting from the on-demand system to the client system the second media asset after transmitting the first media asset; reproducing the second media asset at the client system; and terminating an on-demand session established with the client system after transmitting the second media asset.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings illustrate various embodiments of the present invention and, together with the description, further serve to explain the principles of the invention and to enable a person skilled in the pertinent art to make and use the invention.

DETAILED DESCRIPTION OF PREFERRED EMBODIMENTS

Figure 1:
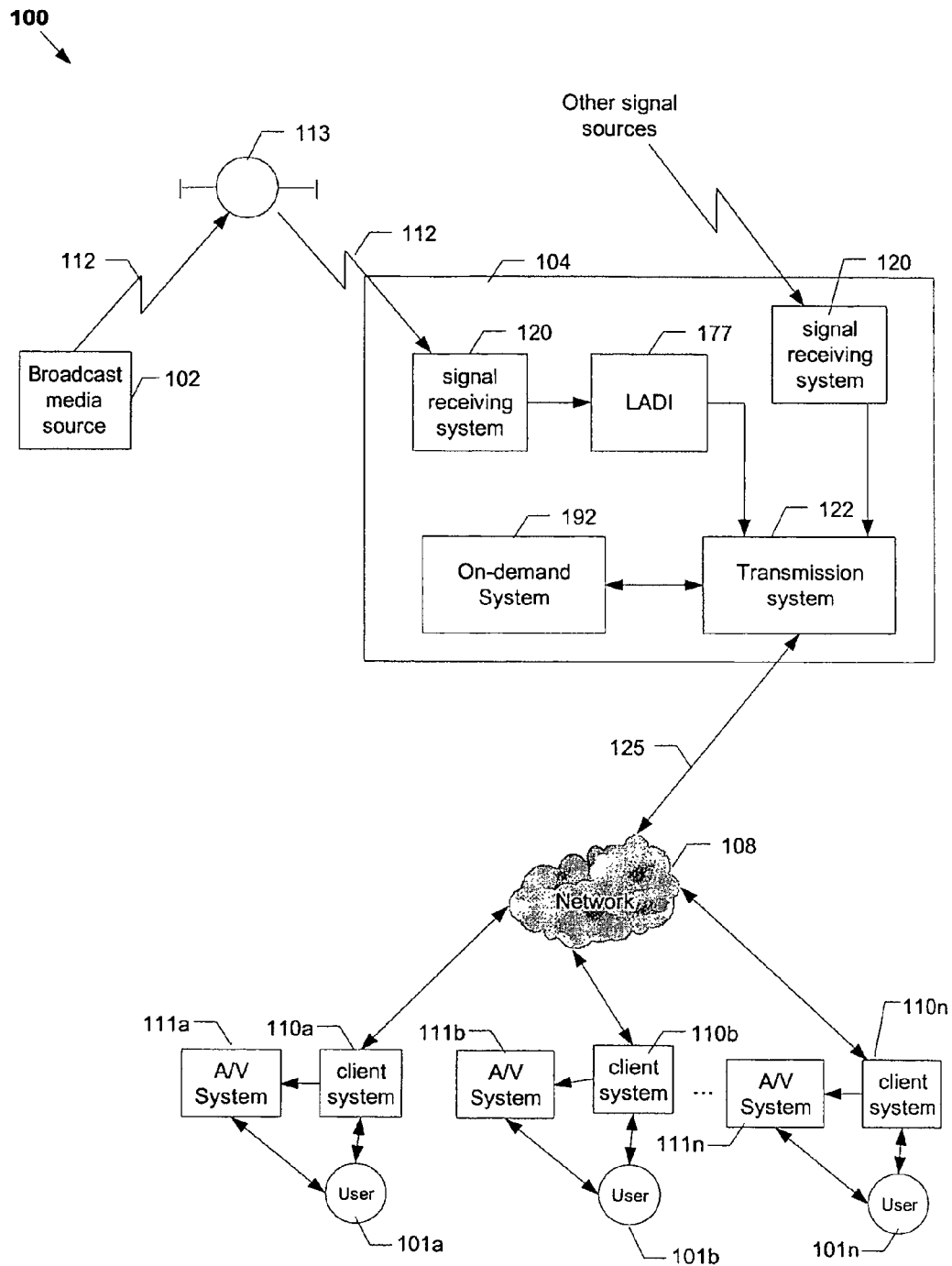
FIG. 1 is a block diagram of a system for providing both an on-demand, personalized media service and a broadcast service to a plurality of users.

FIG. 1 is a block diagram of a system 100 for providing both an on-demand, personalized media service and a broadcast service to users 101a-n. System 100 includes one or more broadcast media sources 102 and one or more signal distribution centers 104. Each distribution center 104 is coupled to a plurality of client systems 110 through a distribution network 108.

Broadcast media source 102 may broadcast a signal 112 to one or more distribution centers 104. As shown in FIG. 1, media source 102 may use a communications satellite 113 to transmit signal 112 to distribution center 104, but other communication methods may also be used.

Preferably, signal 112 contains several (e.g., about 40) broadcast media channels, with each channel being associated with one or more formats or categories of media. For example if signal 112 contains 40 broadcast music channels, one of the broadcast channels may be associated with the Jazz format while another may be associated with the Alternative Rock genre. A channel includes audio and/or video data. A channel may also include application data, which may include, for example, meta-data, instructions and/or other application data. For example, a broadcast music channel may include an audio data stream corresponding to an audio work (e.g., a song) and associated video data. The video data may include images associated with the song (e.g., an image of the artist who recorded the song). A channel may also include application data.

Distribution center 104 may be, for example, a cable head-end. Distribution center 104 may include one or more broadcast signal receiving systems 120 for receiving signals transmitted from broadcast media source 102 as well as other signal sources. Distribution center may also include a transmission system 122 for combining an output of signal receiving systems 120 and on-demand channels outputted by on-demand system 192 to generate a combined signal 125, which is transmitted to client systems 110 via distribution network 108. Accordingly, combined signal 125 may contain several broadcast channels as well as several on-demand channels. In other embodiments, transmission system 122 does not combine the output of signal receiving systems 120 and on-demand channels outputted by on-demand system 192 to generate a combined signal 125, but rather takes the outputs and transmits them to the client systems through the network.

Additionally, distribution center 104 may include a local ad insertion (LADI) system 177 coupled between a signal receiving system 120 and transmission system 122. The LADI system is described in provisional patent application No. 60/623,246, filed on Nov. 1, 2004, the contents of which is incorporated herein by this reference.

Distribution network 108 may include, for example, various amplifiers, bridges, routers, taps, drop cables, and/or other communications equipment. Additionally, distribution network 108 may include one or more forms of a wireless network.

Client systems 110 are operable to isolate at least one of the channels within combined signal 125 and then provide the audio and video data contained in the channel to an audio/video system 111, which reproduces the audio/video for a user 101 to hear and/or view. A/V system 111 preferably includes a display device (e.g., a TV or other display device) for displaying the video portion of the channel. Additionally, systems 110 include a client software application that is operable to display user 101 selectable buttons on the same display system that displays the video data. Although A/V system 111 is illustrated separately from client system 110, it is contemplated that A/V system 111 may be part of client system 110.

The client systems 110 may include, for example, a conventional unidirectional or bi-directional set-top box or a computer equipped with, at the least, an interface (e.g., tuner and demodulator) for receiving information sent through distribution network 108. In another embodiment, the client system 110 may include a computer or similar device which is equipped with an interface (network card or similar) for receiving data packets (e.g., IP packets or other packets) sent through network 108.

Although FIG. 1 shows that all of the components of media-on-demand system 102 are included within distribution center 104, this need not be the case as some or all of the components of media-on-demand system 102 may be located remotely from distribution center 104.

Figure 2:
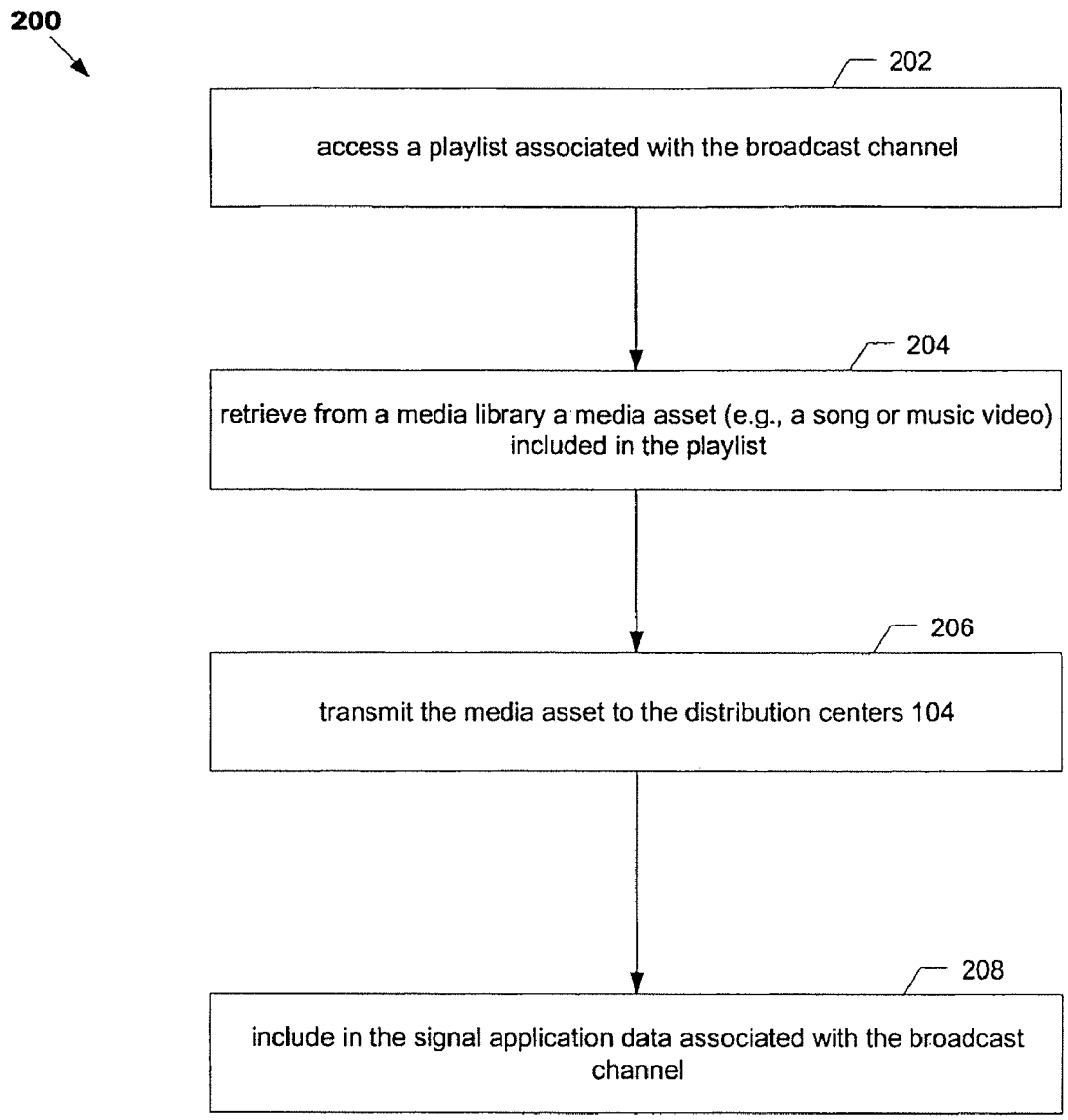
FIG. 2 is a flow chart illustrating a process.

In one embodiment, for at least one broadcast channel, media source 102 performs the process 200 shown in FIG. 2. Process 200 includes a number of steps. In step 202, media source 102 accesses a playlist associated with the broadcast channel. In step 204, media source 102 retrieves from a media library a media asset (e.g., a song or music video) included in the playlist. In step 206, media source 102 transmits the media asset to the distribution centers 104 (i.e., media asset is included in signal 112). In step 208, media source 102 also includes in the signal application data associated with the broadcast channel.

In one embodiment, the media asset retrieved and transmitted by media source 102 contains only audio data, no video data. In this embodiment, media source 102 may create video data to complement the audio data and transmit the video data with the audio data to the distribution centers (systems and methods for creating a visual complement of an audio work are described in U.S. Pat. No. 7,275,256, which is incorporated herein by this reference). Thus, in one embodiment, for a given broadcast channel, media source 102 transmits to the distribution centers 104 audio data corresponding to a song, video data to complement the audio data, and client application data.

Each distribution center 104 may retransmit some or all of this data to a plurality of client systems 110. The client systems 110 that are tuned to the given broadcast channel provide the audio and video data to A/V system 111, which reproduces the audio and displays the video on a display device. Additionally, the client application data may instruct the client systems 110 tuned to the given broadcast channel to display user 101 selectable buttons on top of the video output. That is, the client application data may control at least part of the user interface displayed to the user 101. This feature is illustrated in FIG. 3.

Figure 3:
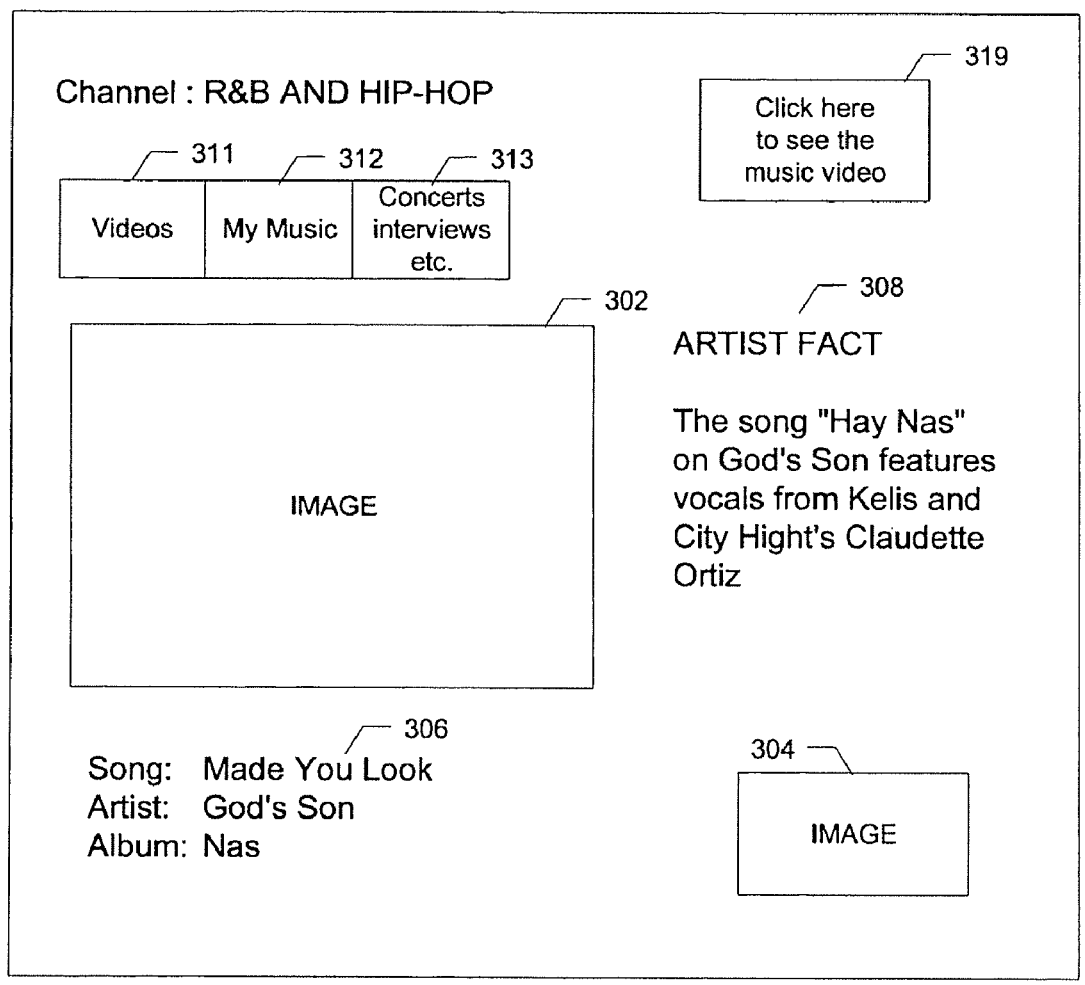
FIG. 3 illustrates content that may be displayed to a user when the user's client system is tuned to a broadcast music channel.

FIG. 3 illustrates video content and buttons that may be displayed on an A/V system 111 display device when the corresponding client system 110 is tuned to the given broadcast music channel. As shown in FIG. 3, the video content may include still images 302, 304 and text 306, 308, all of which may be related to the current audio content of the broadcast channel. For example, still image 302 may be an image of the artist who recorded the audio content and text 306 may provide information about the audio content, such as the name of the song, album and artist. As used herein, the term artist is used broadly to mean an individual or a group of individuals (e.g., a rock band or jazz band).

As also shown in FIG. 3, buttons 311, 312, 313 and 314 may be displayed to the user 101. Button 311 is labeled "videos", button 312 is labeled "my music", and button 313 is labeled "concerts, interviews, etc." A user 101 who wishes to watch one or more specific videos can do so by activating button 311, a user 101 who wishes to listen to a personalized audio channel can do so by activating button 311, and a user 101 who wishes to view/listen to other content (e.g., prerecorded concerts, interviews, and other content) can do so by activating button 312. Although, four buttons are shown in FIG. 3, it is contemplated that more or fewer buttons may be displayed.

As used herein, the term button includes, without limitation, any selectable display element or well-defined area within an interface that is activated (e.g., "clicked") to select a command, such as, a hyperlink or menu-option, wherein, when the element is activated by the user 101, the client system 110 may perform some action in response.

In some embodiments, a user 101 can "activate" a button 311-314 using a remote control (not shown) that communicates with client system 110 or using a client system 110 control panel (not shown). For example, the user 101 can press buttons on the remote control or control panel to highlight a button and then after the button is highlighted press a button labeled "ok" to thereby activate the button.

Additionally, in some embodiments, client system 110 may include a remote control having buttons corresponding to user interface buttons 311-314, such that activating one of the corresponding buttons on the remote control has the same effect as activating the corresponding button 311-314. For example, the remote control may have a button labeled "videos," and pressing the "videos" button on the remote may have the same effect as activating button 311.

In response to a user 101 activating button 311, client system 110 communicates with on-demand system 192 to initiate an on-demand session. For example, client system 110 may transmit to on-demand system 192 information identifying the button activated by the user 101, information identifying the broadcast channel to which the user 101 device was tuned when the user 101 activated the button, and information identifying the artist of the song that was playing when the user 101 activated the button.

Figure 4:
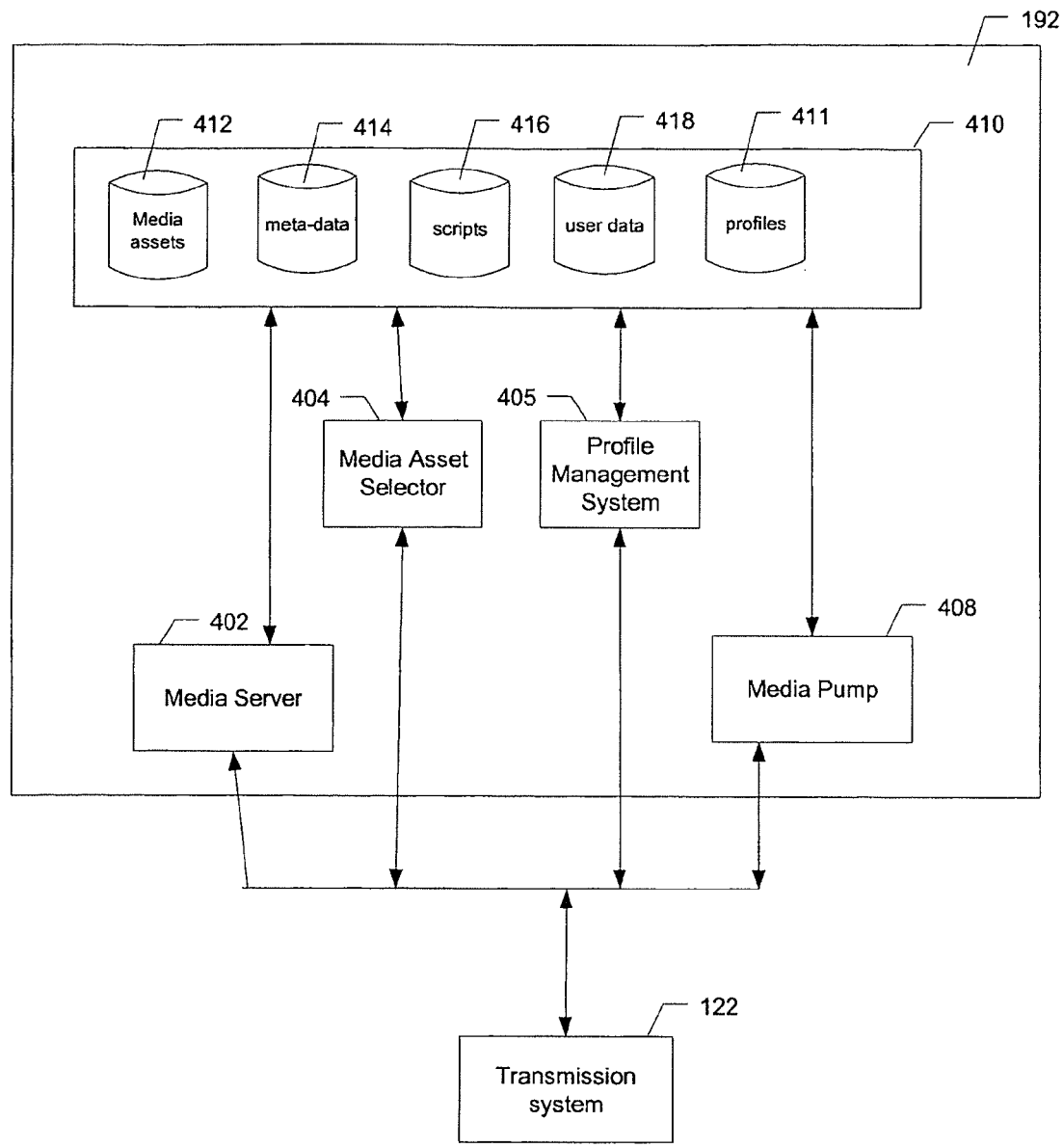
FIG. 4 illustrates a functional block diagram of one embodiment of on-demand system 192.

Referring now to FIG. 4, FIG. 4 illustrates a functional block diagram of one embodiment of on-demand system 192. As shown in FIG. 4, on-demand system 192 may include a media server 402, a media asset selector 404, a profile management system 405, a media pump 408, and a storage system 410 for storing user 101 created profiles 411, a collection of media assets 412, meta-data 414, which may be stored in a database, a collection of scripts 416, and user 101 data 418, which also may be stored in a database. Some or all of the media assets 412 may be linked with meta-data 414. For example, where a given media asset is a music video or song, the given media asset may be linked with meta-data, wherein the meta-data includes information about the music video, such as, the title, artist, genre, director, length, etc.

One or more computer and storage systems may be used to implement on-demand system 192. For example, one or more computer systems may be used to implement media server 402 while one or more other computer systems may be used to implement media asset selector 404. The computer systems may be co-located or located in several different facilities. Accordingly, media asset selector 404 and media server 402 may be implemented in software and/or hardware.

In some embodiments, media server 402 is capable of outputting digital data streams at a constant rate to numerous client systems 110 simultaneously. Media server may be implemented using a conventional video-on-demand ("VOD") or VOD-like server. In some embodiments, client system 110 can buffer data so that media server 402 does not have to transmit at constant rates.

Storage system 410 may include one or more storage devices, such as hard disk drives, CD/DVD drives, and/or other storage devices. The storage devices that make up storage system 410 may or may not be co-located, and each storage device may or may store only one type of information. For example, a first set of one or more storage devices may store media assets 412 and a second set of one or more storage devices may store scripts 416.

User 101 data 418 may include information about users 101. That is each user 101 may have associated user 101 data. For example, for each user 101, the database of user 101 data may include: demographic information about the user 101 (e.g., age, sex, location, income), a list of the most recent (e.g., within the last 4 months) assets requested by the user 101, a list of the most recent advertisements transmitted to the user 101, information indicating whether the user 101 selected a predetermined asset a predetermined number of times within a predetermined period, etc.

Figure 5:
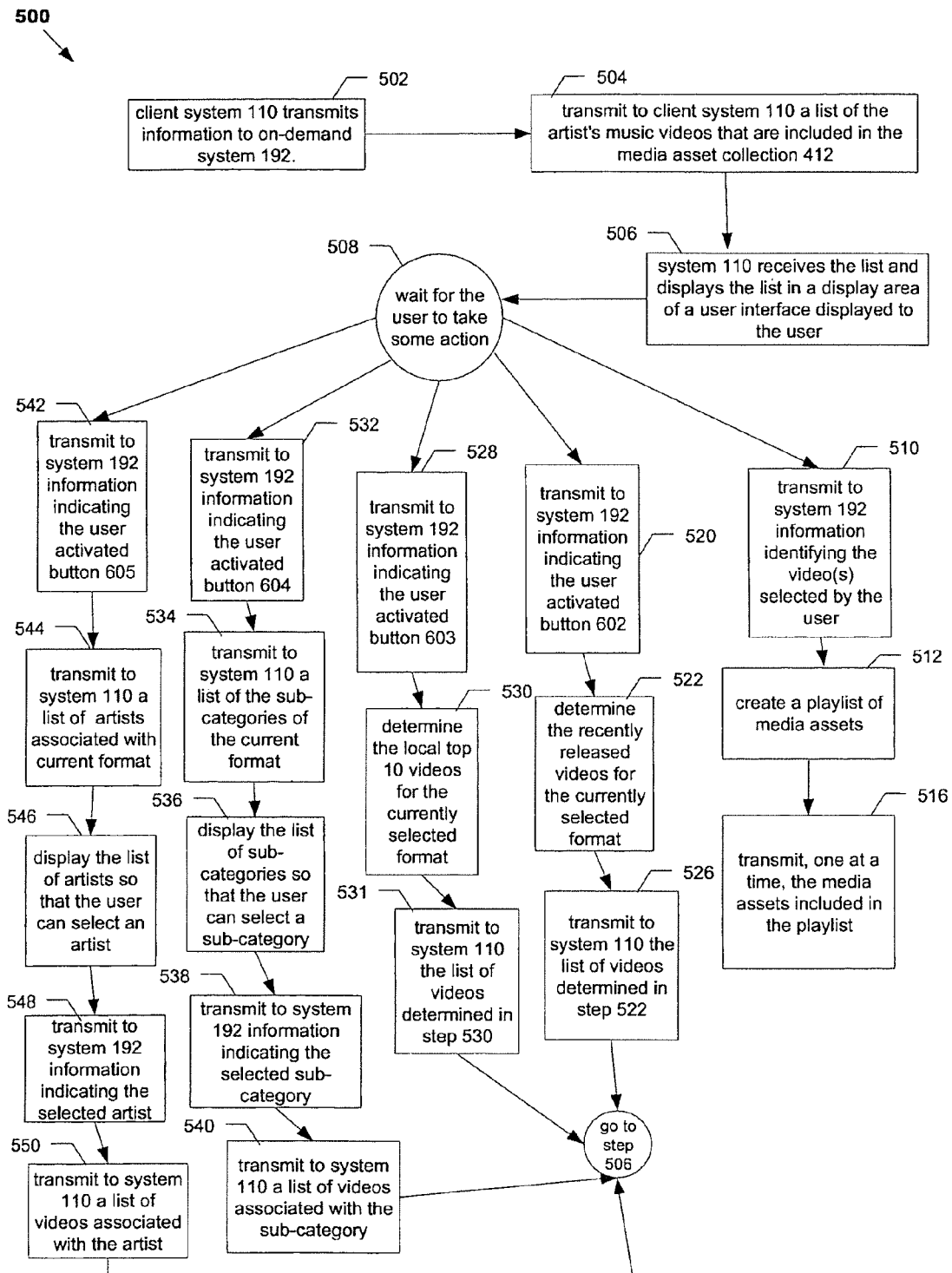
FIG. 5 is a flow chart illustrating a process according to an embodiment of the invention.

Referring now to FIG. 5, FIG. 5 is a flow chart illustrating a process 500, according to some embodiments, performed after the user 101 activates "videos" button 311. As mentioned above, a user 101 may activate button 311 if the user 101 wishes to view one or more music videos. Process 500 may begin in step 502. In step 502, client system 110 transmits information to on-demand system 192. The information may include: (a) information identifying the channel to which client system 110 was tuned when the user 101 activated button 110, (b) information indicating that the user 101 activated button 311, and (c) information identifying the artist of the song that was playing when the user 101 activated the button.

In step 504, on-demand system 192 transmits to client system 110 a list of the artist's music videos that are included in the media asset collection 412. For example, the user 101 may have selected button 311 at a point in time when the user 101 was tuned to a broadcast music channel that was playing a song by the artist U2, in which case, on-demand system 192 would transmit to client system 110 a list of zero or more of U2's music videos. Preferably, on-demand system 192 does not include in the list the titles of any videos that are not included in media asset collection 412.

Figure 6:
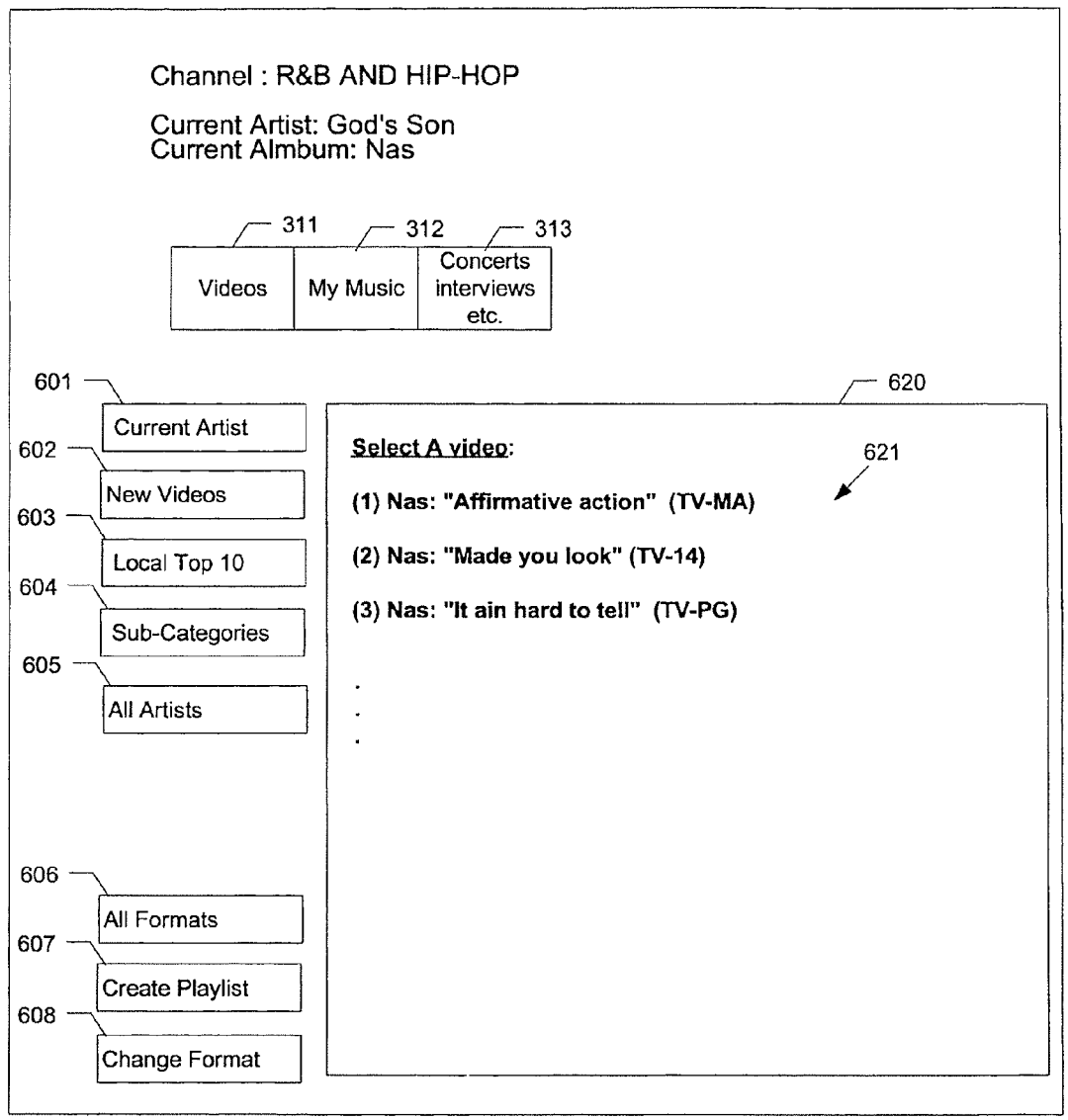
FIG. 6 illustrates an example user interface.

In step 506, client system 110 receives the list and displays the list in a display area of a user interface displayed to the user 101. The user interface includes selectable buttons. FIG. 6 illustrates an exemplary user interface 600 that may be displayed in step 506.

Referring now to FIG. 6, user interface 600 includes a display area 620 for displaying the list of music video titles 621 received from on-demand system 192. User interface 600 also includes buttons 601-608.

In step 508, client system 110 waits for the user 101 to take some action. For example, the user 101 may select to view one or more of the listed videos. To do this, the user 101 may highlight one or more of the listed video titles and then activate a button on the remote control (not shown) that communicates with client system 110. If the user 101 selects to view one or more of the listed videos then control may pass to step 510. In some embodiments, to select more than one video, the user 101 may first have to activate "create playlist" button 607. In these embodiments, selecting button 607 enables the user 101 to select up to X videos, where X is greater than or equal to 2. In one example, selecting button 607 enables the user 101 to select up to 10 videos. Additionally, in these embodiments, control may not pass to step 510 until the user 101 has indicated that he/she is done selecting videos. A selectable button may be displayed to the user 101 for this purpose. Such a button may be labeled "start playlist" or "done selecting."

Figure 7:
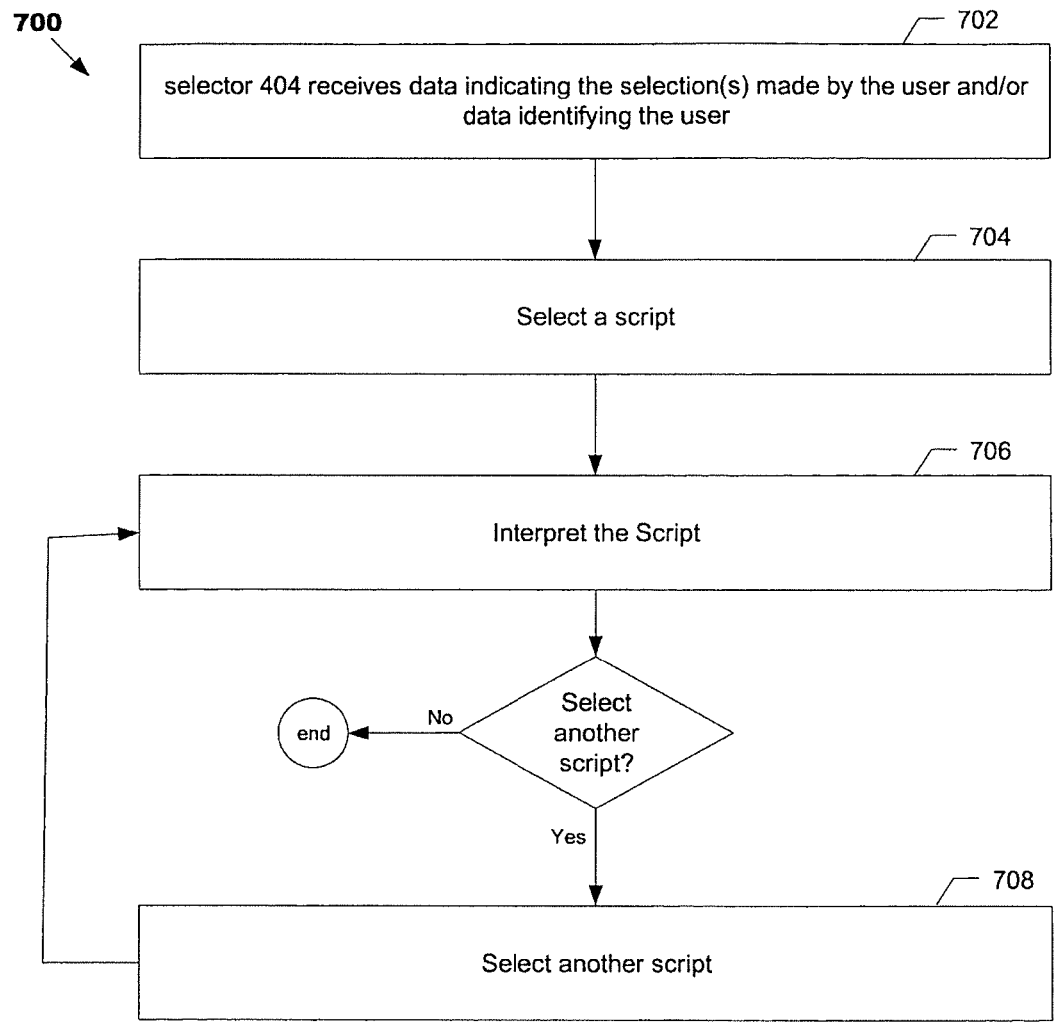
FIG. 7 illustrates a process for creating the playlist according to an embodiment of the invention.

In step 510, client system 110 transmits to on-demand system 192 information identifying the video(s) selected by the user 101. In step 512, system 192 creates a playlist of media assets (FIG. 7 illustrates a process for creating the playlist). That is, system 192 determines the media assets that it will transmit to client system 110 in response to receiving from client system 110 the information identifying the video (s) selected by the user 101. Preferably, the playlist includes the video(s) selected by the user 101 and zero or more other media assets. For example, the playlist may include one or more short advertisements in addition to the video(s) selected by the user 101.

In step 516, media server 402 transmits (e.g., by streaming) one at a time the media assets included in the playlist. Preferably, the media assets are transmitted in playlist order. In this way, when a user 101 selects to watch a video, the user 101 may first see a short advertisement, then one of the selected videos, then another short advertisement, etc.

In some embodiments, a user 101 can "link" from a playing asset to another asset. For example, in one embodiment, a user 101 may activate a particular button (on the remote control or displayed on the display screen) while listening to/watching the asset that is being transmitted in step 516. Activating the particular button may cause client system 110 to transmit to on-demand system 192 a command associated with the activated button. In response to receiving the command, on-demand system 192 may cease transmitting whichever asset is currently being transmitted ("the current asset") and transmit another asset. As a specific example, the particular button may be a "skip" or "next" button, in which case, in response to receiving the command, on-demand system 192 ceases transmitting the current asset and transmits an asset included in the playlist that has not already been transmitted. If the playlist is an ordered list of assets, then on-demand system 192 transmits the asset that follows the asset that was playing when the user 101 activated the button.

Additionally, in some embodiments, activating a particular button may cause client system 110 to transmit to on-demand system 192 an asset identifier associated with an asset. In response to receiving the asset identifier, on-demand system 192 may cease the current asset and transmit the asset identified by the identifier. In this way, the user 101 can link from one asset that is in the playlist to another asset that may not be in the playlist. For example, the current asset may be a promotion for a newly added video and the asset identifier is an identifier that identifies the new added video. Thus, while the user 101 is watching the promotion, the user 101 can simply just activate a button to see the newly added video that is the subject of the promotion.

Preferably, after the identified asset has been fully transmitted to the client system 110, on-demand systems resumes playing the playlist. That is, after the identified asset has been fully transmitted, on-demand system 192 transmits an asset included in the playlist that has not already been transmitted. If the playlist is an ordered list of assets, then on-demand system 192 transmits the asset that follows the asset that was playing when the user 101 activated the button.

Referring now to FIG. 7, FIG. 7 is a flow chart illustrating a process 700 performed by media asset selector 404, according to one embodiment, for creating a playlist in response to a user 101 selecting one or more videos. Process 500 may begin in step 702, where media asset selector 404 receives data indicating the selection(s) made by the user 101 and/or data identifying the user 101 and/or client system 110 (e.g., user 101-id associated with the user 101 or a device id associated with the client system 110). Thus, for example, if the user 101 selected one music video, then media asset selector 404 may receive in step 702 data identifying the selected music video. The data may include the name of the music video or a unique code associated with the music video or channel.

Figure 8:
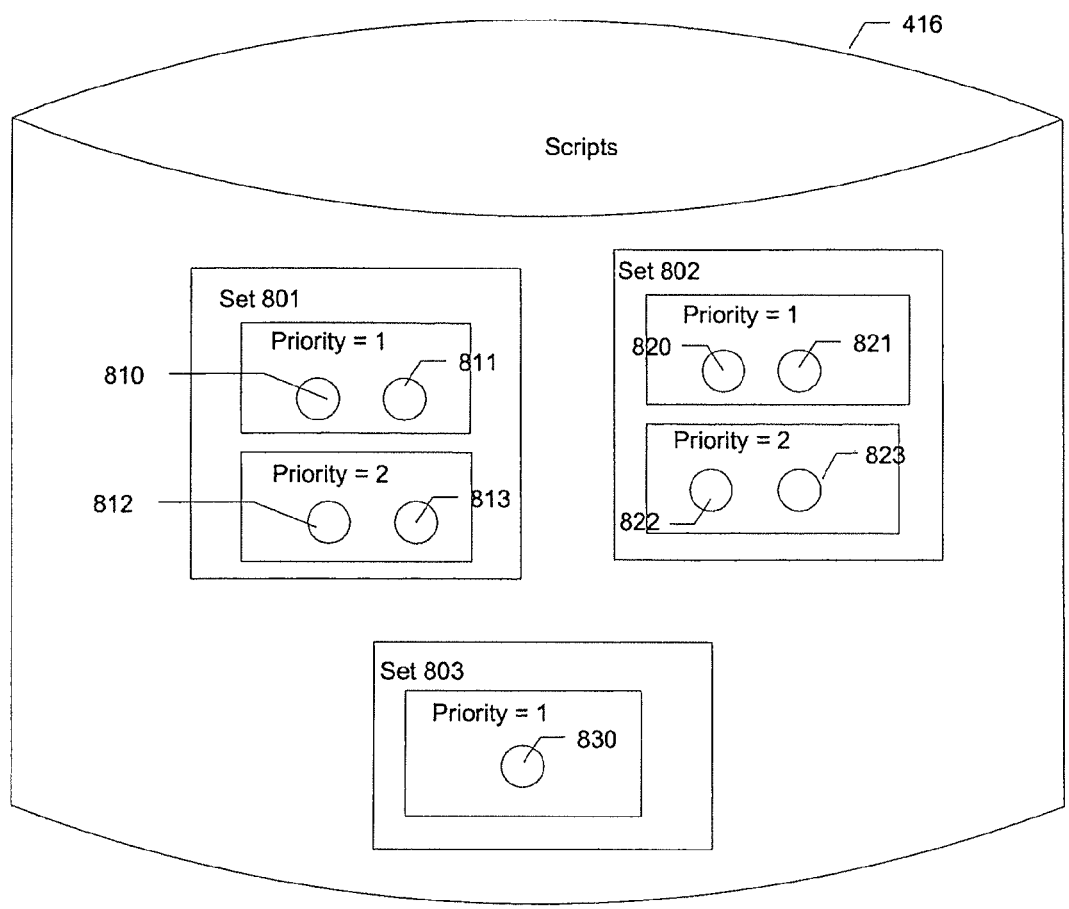
FIG. 8 illustrates three sets of scripts.

In step 704, media asset selector 404 selects one of the scripts 416. Scripts 416 instruct media asset selector 404 as to which media assets should be included in the media asset package. On-demand system 192 may include a set of scripts or multiple sets of scripts. Accordingly, in some embodiments, each script has a priority assigned to it. This feature is illustrated in FIG. 8. FIG. 8 shows three sets of scripts, sets 801, 802 and 803. FIG. 8 also shows that each script in each set may be assigned a priority value. For example, scripts 810 and 811 of set 801, scripts 820 and 821 of set 802, and script 830 of set 803 are each assigned a priority value of "1" and scripts 812 and 813 of set 801 and scripts 822 and 823 of set 802 are each assigned a priority value of "2". In this example, the lower the priority value, the "higher" the priority. So, scripts 810, 811, 820, 821 and 830 have the "highest" priority.

In some embodiments, in step 704, media asset selector 404 selects the script having the highest priority (if two or more scripts have the same priority, then the selector may randomly select one of the high priority scripts).

In step 706, media asset selector 404 interprets the selected script. That is, media asset selector 404 performs actions as instructed by the script. Accordingly, the script includes instructions that instruct media asset selector 404 to take certain actions, such as, for example: performing logical operations, comparing values, retrieving data from a database, writing data to a file, selecting another script to interpret, and selecting certain media assets to include in a playlist. Because a script may instruct media asset selector 404 to include one or more assets in a playlist, a playlist may be partially or fully specified as a result of interpreting the script.

In some embodiments, each script 416 is written in a language similar to Javascript or other well-known scripting languages. Thus, the scripts provide, among other things, looping and decision making control structures (e.g., IF/WHILE statements), thereby enabling a script author to implement detailed and/or complex logic flow in asset selection.

After step 706, the process may end or may proceed to step 708. The process may end if, after interpreting the script, a complete playlist is specified. In step 708, media asset selector 404 selects another script. The script selected in step 708 may be the next highest priority script or a script identified by the first script. That is, the first script may include an instruction instructing media asset selector 404 to next select and interpret a specific script. After step 708, the process returns to step 706.

Because the media assets to be included in a playlist are selected based on one or more scripts, the selector system 404 is highly flexible and easy to maintain.

Referring back to FIG. 6, buttons 601-608 enable a user 101 to find the video(s) the user 101 would like to watch. For example, if the user 101 is interested in selecting a newly added video, the user 101 may select button 602. In response to user 101 selecting button 602, client system 110 transmits to on-demand system 192 information indicating that the user 101 activated button 602 (step 520). In response, on-demand system 192 determines the newly added videos for the currently selected format (step 522). This information may be stored in a database within system 192.

In the situations where the user 101 activated videos button 311 when client system 110 was tuned to a particular broadcast music channel, then, initially, the currently selected format is format of that particular broadcast channel. So, for example, if the user 101 had client system 110 tuned to the "R&B and Hip-Hop" broadcast music channel when the user 101 activated button 311, then, until changed by the user 101, the currently selected format is "R&B and Hip-Hop." The user 101 can change the selected format by activating the "change format button" 608 and selecting a new format. Additionally, the user 101 can select button 606 to select all formats. By selecting "all formats" button 606, the user 101 is given the option to select videos across all formats of music. In step 526, on-demand system 192 transmits to client system 110 a list of the newly added videos determined in step 522. After step 526, control passes back to step 506.

If the user 101 is interested in selecting a popular video, the user 101 may select button 603. In response to user 101 selecting button 603, client system 110 transmits to on-demand system 192 information indicating that the user 101 activated button 603 (step 528). In response, on-demand system 192 determines the local top 10 videos for the currently selected format (step 530). This information may be determined from information stored in a database. Accordingly, on-demand system 192 may record all user 101 video selections so that the popular videos can be determined. In step 531, on-demand system 192 transmits to client system 110 a list of the videos determined in step 530. After step 531, control passes back to step 506.

Figure 9:
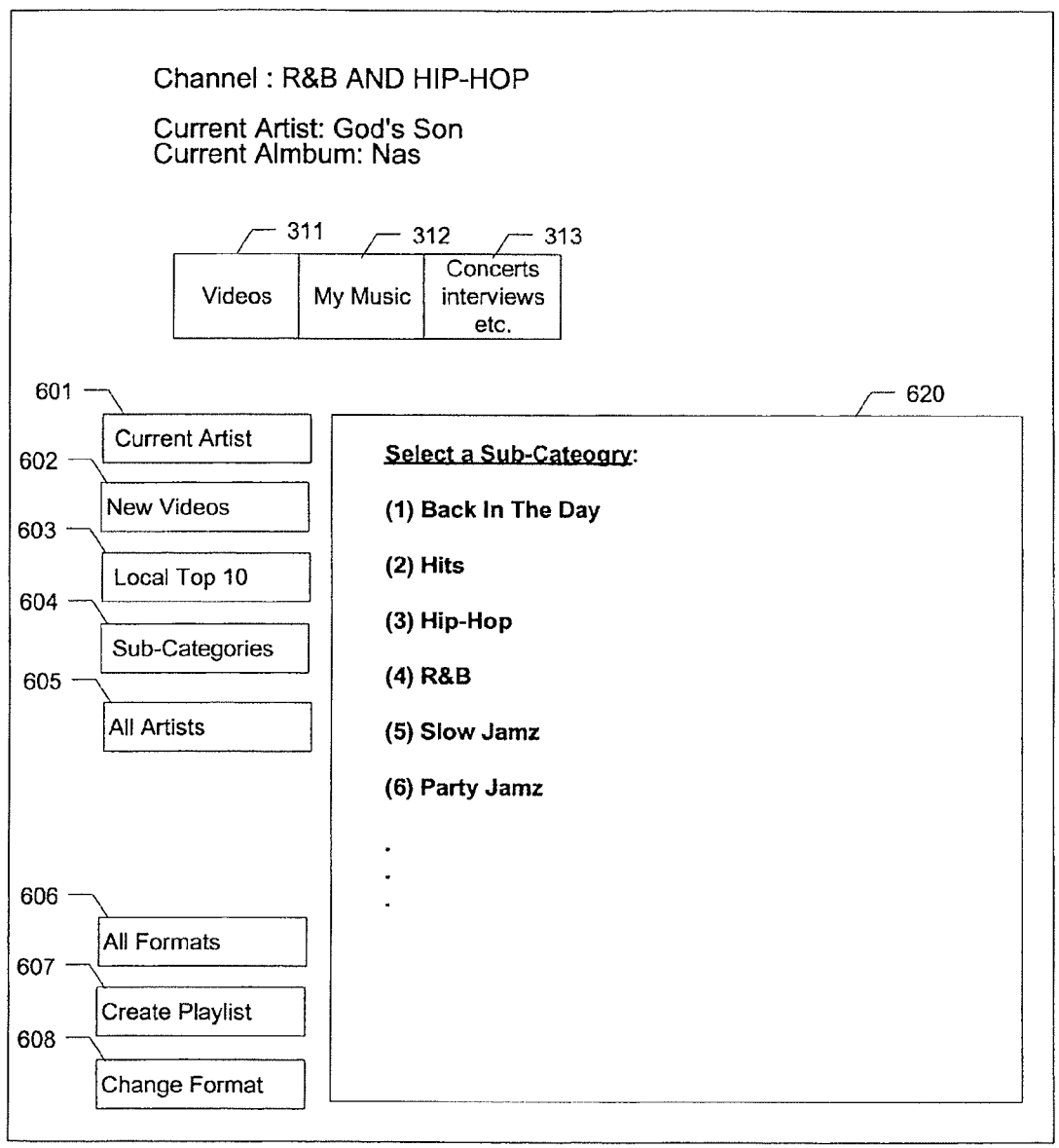
FIG. 9 illustrates an example user interface.

If the user 101 is interested in selecting a video from a particular sub-category of the currently selected format, the user 101 may activate button 604. In response to user 101 selecting button 604, client system 110 transmits to on-demand system 192 information indicating that the user 101 activated button 604 (step 532). In response, on-demand system 192 transmits to client system 110 a list of the sub-categories of the current format (step 534). Client system 110 displays the list of sub-categories to the user 101 so that the user 101 can select a sub-category (step 536) (see FIG. 9). In response to a user 101 selecting a sub-category, client system 110 transmits to on-demand system 192 information indicating the sub-category selected by the user 101 (step 538). In response, on-demand system 192 transmits to client system 110 a list of videos associated with the selected sub-category (step 540). After step 540, control passes back to step 506.

Figure 10:
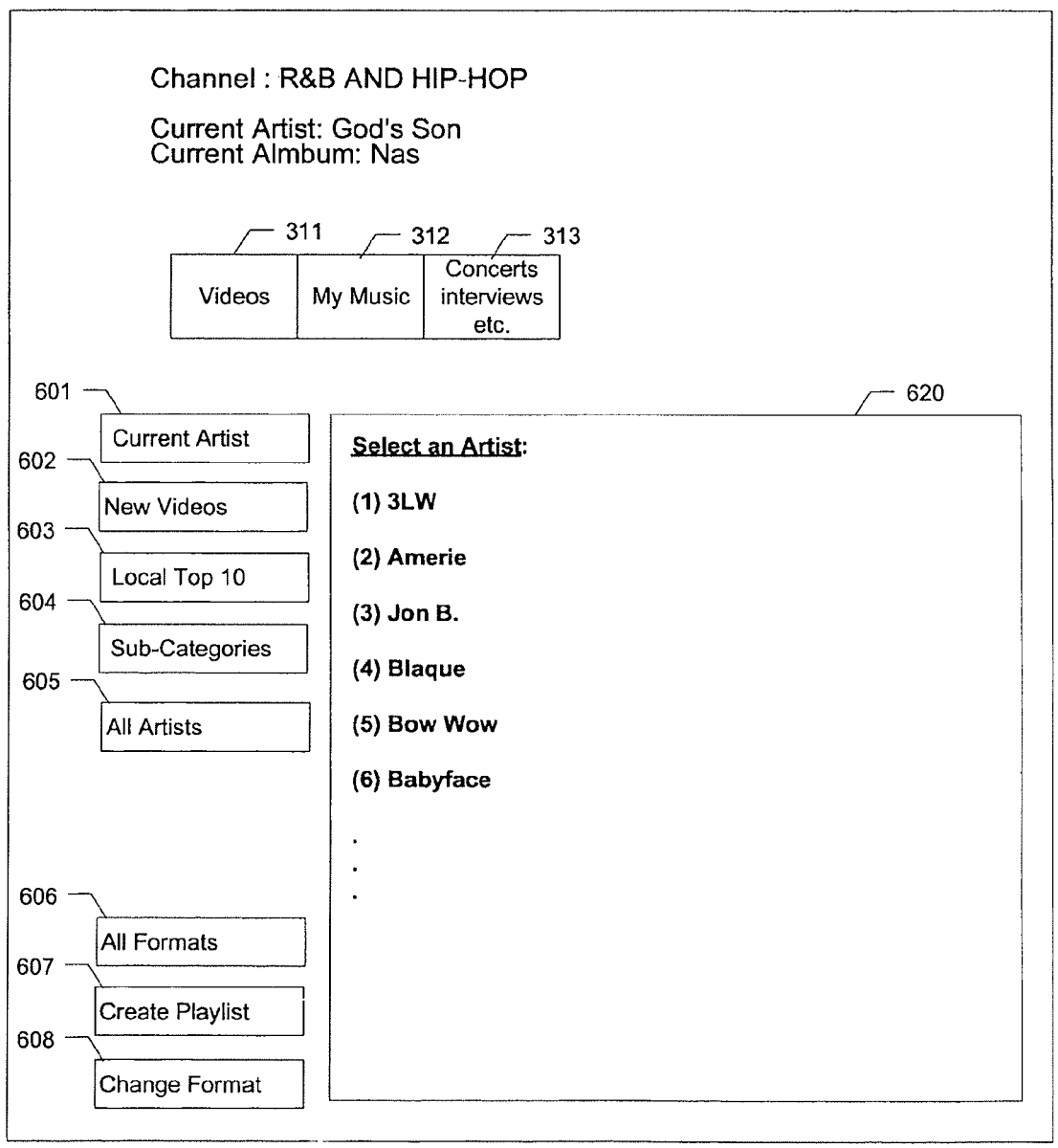
FIG. 10 illustrates an example user interface.

If the user 101 is interested in selecting a video from a particular artist associated with the currently selected format, the user 101 may activate button 605. In response to user 101 selecting button 605, client system 110 transmits to on-demand system 192 information indicating that the user 101 activated button 605 (step 542). In response, on-demand system 192 transmits to client system 110 a list of the artists associated with the current format (step 544) (if the user 101 had selected button 606—all formats—followed by button 605, then the list will include artists associated with all formats). Client system 110 displays the list of artists to the user 101 so that the user 101 can select an artist (step 546) (see FIG. 10). In response to a user 101 selecting an artist, client system 110 transmits to on-demand system 192 information indicating the artist selected by the user 101 (step 548). In response, on-demand system 192 transmits to client system 110 a list of videos associated with the artist (step 550). After step 550, control passes back to step 506.

Figure 11:
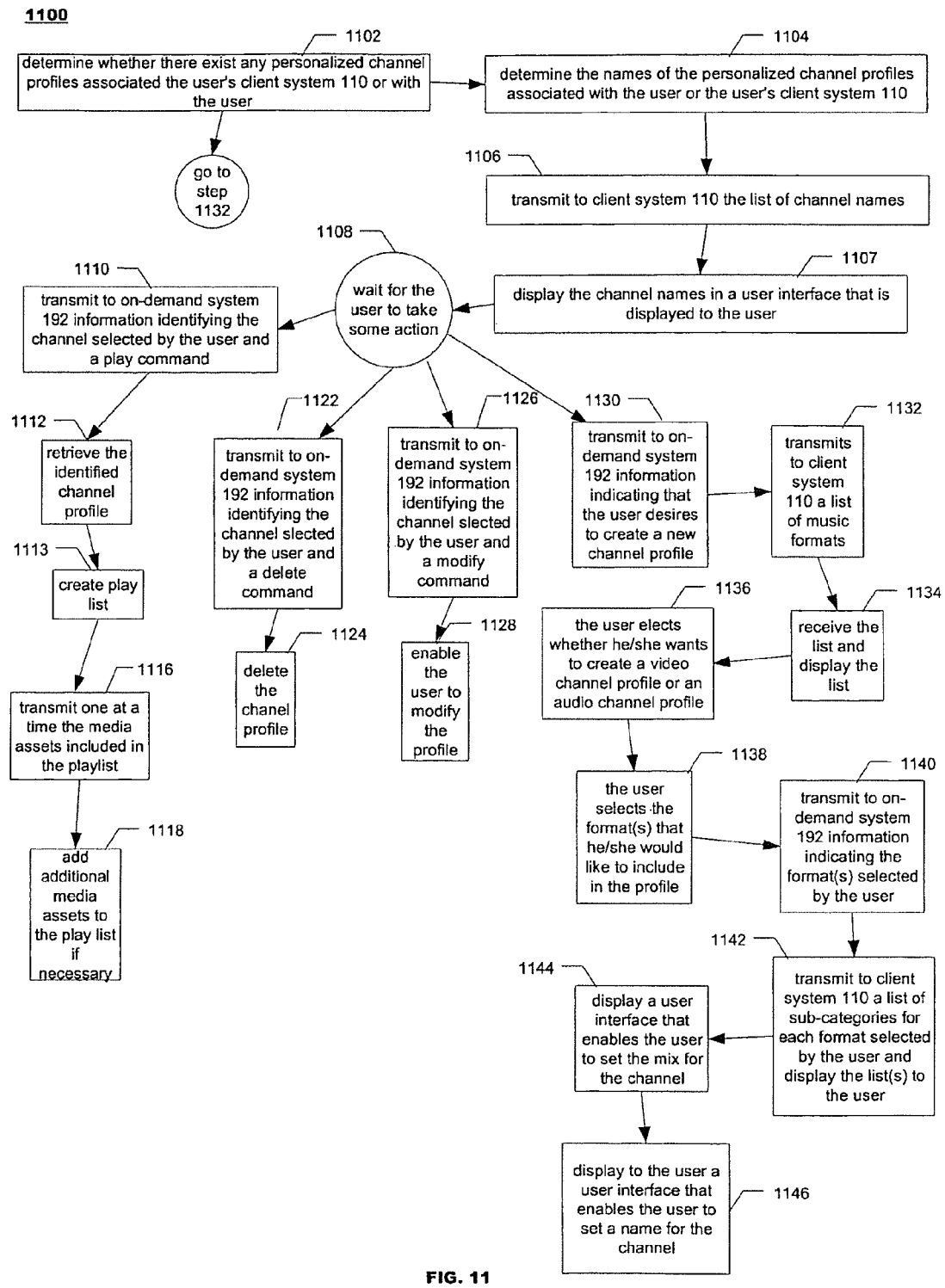
FIG. 11 is a flow chart illustrating a process according to an embodiment of the invention.

Referring back to FIG. 3, a user 101 who wishes to initiate a personalized on-demand session (i.e., a "personalized channel") can do so by activating button 312. A "personalized channel" may be an audio channel, a video channel or in some embodiments, a combination of audio and video channels. Referring now to FIG. 11, FIG. 11 is a flow chart illustrating a process 1100, according to some embodiments, performed in response to a user 101 activating button 312, which is displayed on a display device of or connected to client system 110.

Process 1100 may begin in step 1102, where a determination is made as to whether on-demand system 192 has any personalized channel profiles 411 associated the user 101's client system 110 or with the user 101. If on-demand system 192 does not have any such personalized channel profiles 411, control may pass to step 1132, otherwise control may pass to step 1104.

In step 1104, on-demand system 192 determines the names of the personalized channel profiles associated with the user 101 or the user 101's client system 110. In step 1106, on-demand system 192 transmits to client system 110 the list of determined names. In step 1107, client system 110 displays the names of the personalized channels in a user interface that is displayed on the display device.

Figure 12:
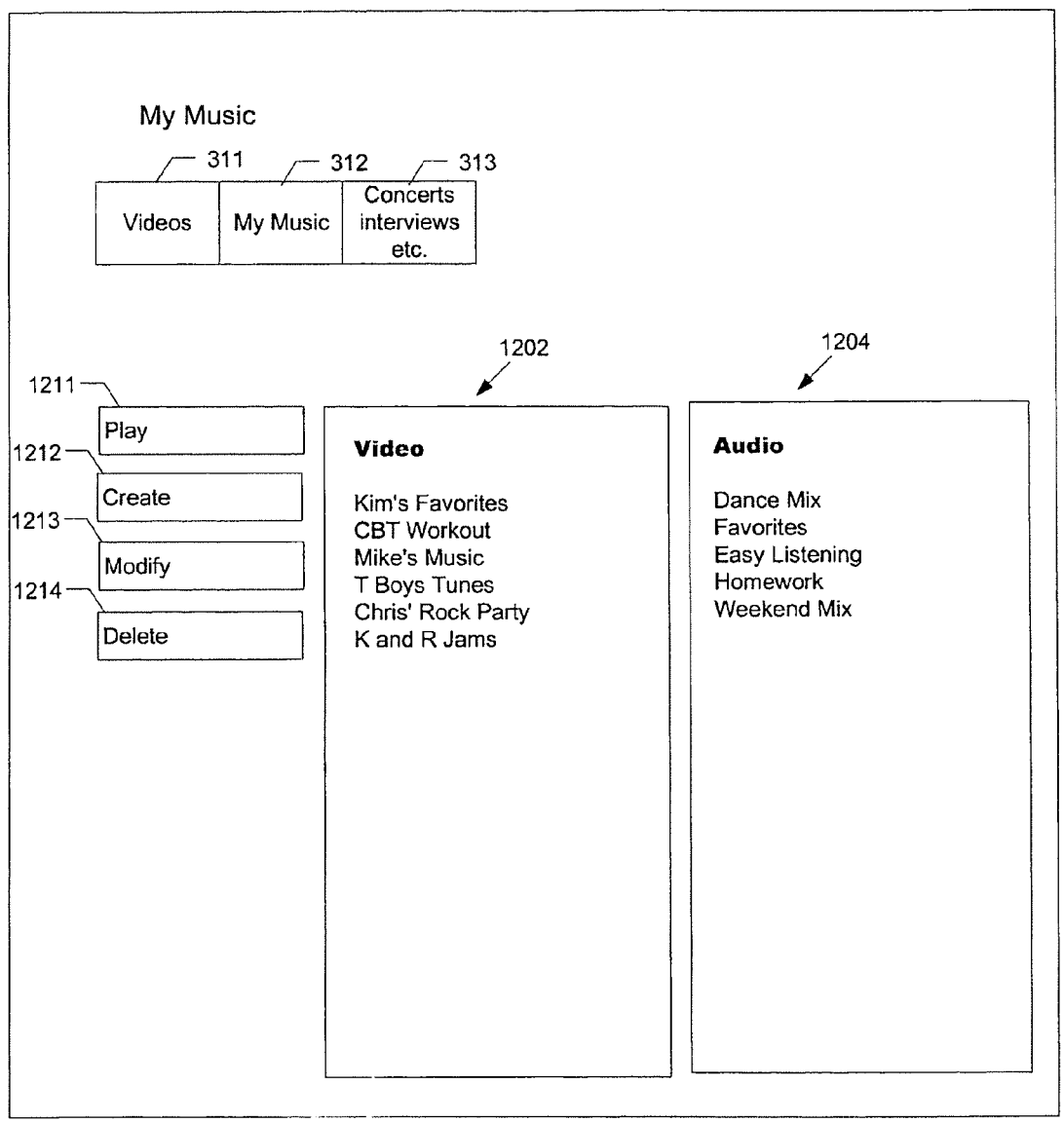
FIGS. 12-16 and 22 illustrate example user interfaces.

FIG. 12 illustrates an exemplary user interface 1200 that may be displayed in step 1108. As shown in FIG. 12, the names of several personalized video channel profiles are listed in one display area 1202 and the names of several personalized audio channel profiles are listed in another display area 1204. Also displayed to the user 101 are menu-options 1211-1214.

In step 1108, client system 110 waits for the user 101 to take some action. At this point, the user 101 has several options. The user 101 may elect to play, create, modify and delete one of the channel profiles (or simply "channel" for short). To play, modify or delete one of the channels, the user 101 may highlight the name of the channel the user 101 wants to play, modify or delete, and then activate the appropriate button 1211-1214 by using a remote control interfaced with client system 110, as is well known in the art.

If the user 101 elects to play one of the listed channels then control may pass to step 1110. In step 1110, client system 110 transmits to on-demand system 192 information identifying the channel selected by the user 101 and information indicating that the user 101 desires "play" the channel profile. For example, the information may include the name of the channel or an identifier uniquely associated with the channel and a "play" command.

In step 1112, system 192 retrieves the identified channel profile, and, in step 1113, creates a playlist of one or more media assets based, at least in part, on the contents of the selected channel profile. That is, on-demand system selects one or more media assets based, at least in part, on the channel profile. As discussed above, on-demand system may interpret one or more scripts to create the playlist. Accordingly, in some embodiments, on-demand system 192 may include a script for creating playlists based on channel profiles. Preferably, the playlist created in step 1113 includes a work or works that match the profile selected by the user 101. In this way, the playlist will likely include works that the user 101 will enjoy. Additionally, the playlist may include or consist of one or more short advertisements (e.g., a promotional message).

In step 1116, media server 402 transmits (e.g., by streaming) one at a time the media assets included in the playlist. Preferably, the media assets are transmitted in playlist order. In step 1118, on-demand system adds additional media assets to the play list if necessary. Additional media assets may need to be added to the playlist if the end of the play list is approaching. On-demand system 192 may approach the end of the playlist if, within a certain amount of time from initiating the personalized session, the user 101 does not indicate to client system 110 that the user 101 wishes to terminate the personalized session. This amount of time, of course, depends on the length of the playlist.

If the user 101 elects to delete one of the listed channel profiles, then control may pass to step 1122. In step 1122, client system 110 transmits to on-demand system 192 information identifying the channel profile selected by the user 101 and information indicating that the user 101 desires to delete the channel profile. In step 1124, on-demand system 192 deletes the profile.

If the user 101 elects to modify one of the listed channel profiles, then control may pass to step 1126. In step 1126, client system 110 transmits to on-demand system 192 information identifying the channel profile selected by the user 101 and information indicating that the user 101 desires to modify the channel profile. In step 1128, on-demand system enables the user 101 to modify the profile by, for example, adding formats to the profile or removing formats from the profile.

If the user 101 elects to create a new personalized channel, then control may pass to step 1130. In step 1130, client system 110 transmits to on-demand system 192 information indicating that the user 101 desires to create a new channel profile. In step 1132, on-demand system 192 transmits to client system 110 a list of music formats. In step 1134, client system 110 receives the list and displays the list in a display area of a user interface displayed to the user 101.

Figure 13:
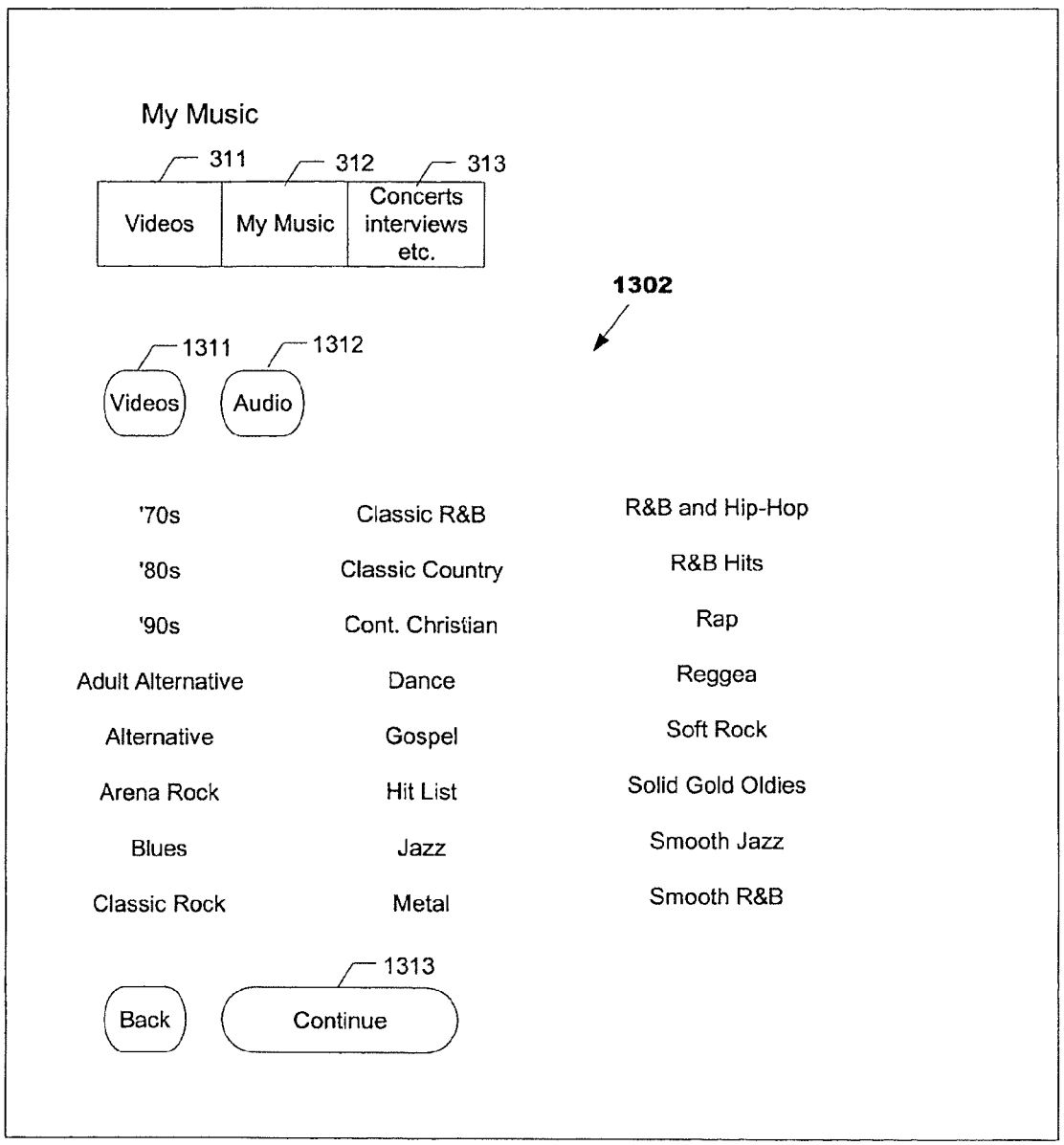

FIG. 13 illustrates an exemplary user interface 1300 that may be displayed in step 1134. As shown in FIG. 13, the names of several music formats are listed in a display area 1302.

In step 1136, the user 101 elects whether he/she wants to create a video channel profile or an audio channel profile. To select a video channel profile, the user 101 would, of course, activate videos button 1311, and to select an audio channel profile, the user 101 would activate audio button 1312.

Figure 14:
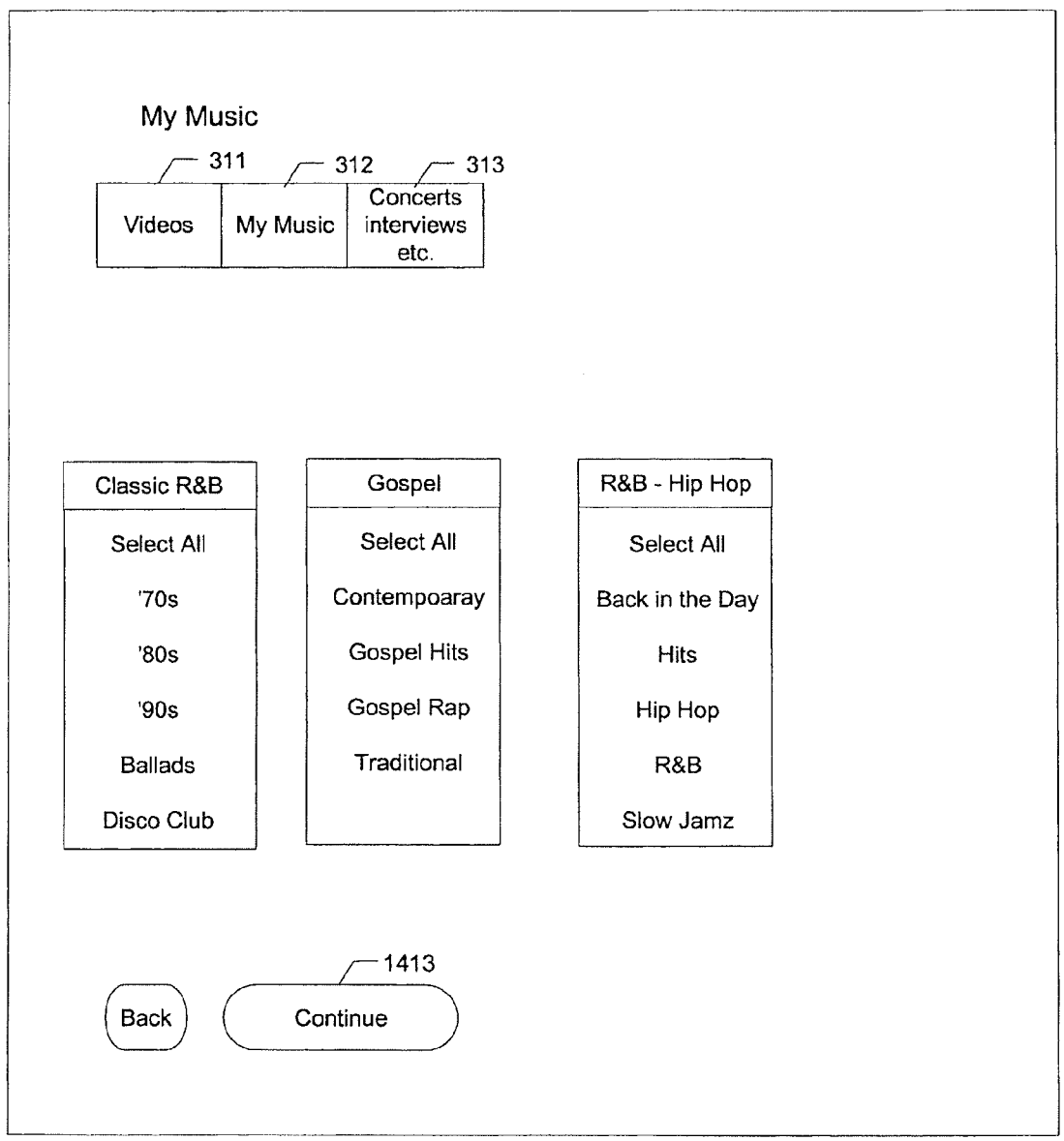

In step 1138, the user 101 selects the format(s) that he/she would like to include in the profile and then selects the "continue" button 1313. For example, the user 101 may wish to create a channel profile that includes the "Classic R&B", "Gospel" and "R&B" "Hip Hop" formats. In response to the user 101 selecting a format(s) and activating button 1313, client system 110 may transmit to on-demand system 192 information indicating the format(s) selected by the user 101 (step 1140). In step 1142, on-demand system 192 may transmit to client system 110 a list of sub-categories for each format selected by the user 101 and client system displays the list(s) to the user 101. FIG. 14 illustrates a user interface 1400 that may be displayed in step 1142. User interface 1400 enables the user 101 to select one or more sub-categories for each category of music selected in step 1138. When the user 101 is finished selecting the sub-categories the user 101 may activate continue button 1413.

Figure 15:
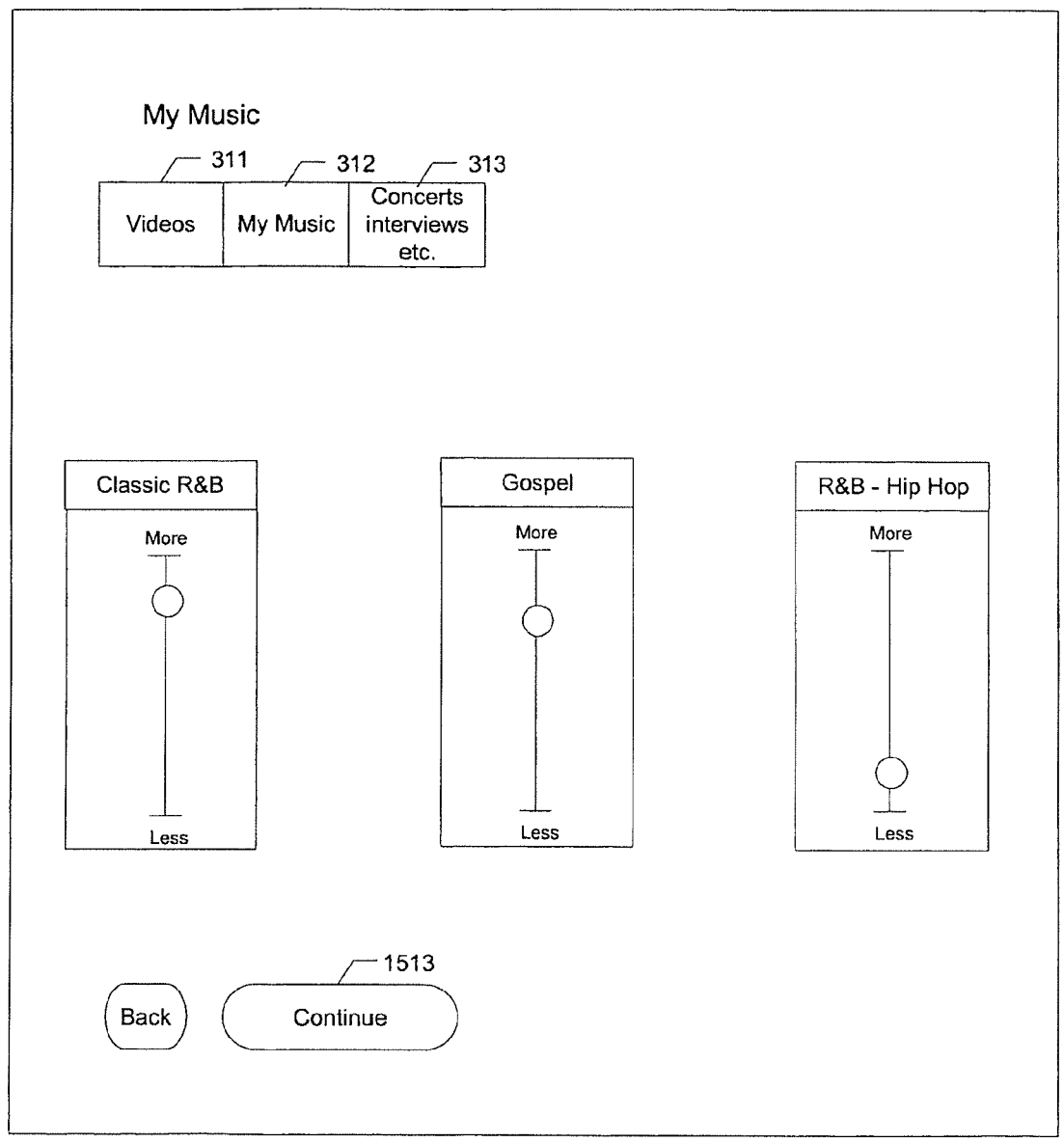

In step 1144, client system 110 displays to the user 101 a user interface that enables the user 101 to set the mix for the channel. That is, it enables the user 101 give a weight to each format selected in step 1138. FIG. 15 illustrates a user interface 1500 that may be displayed in step 1144. When the user 101 is finished setting the mix for the channel, the user 101 may activate continue button 1513.

Figure 16:
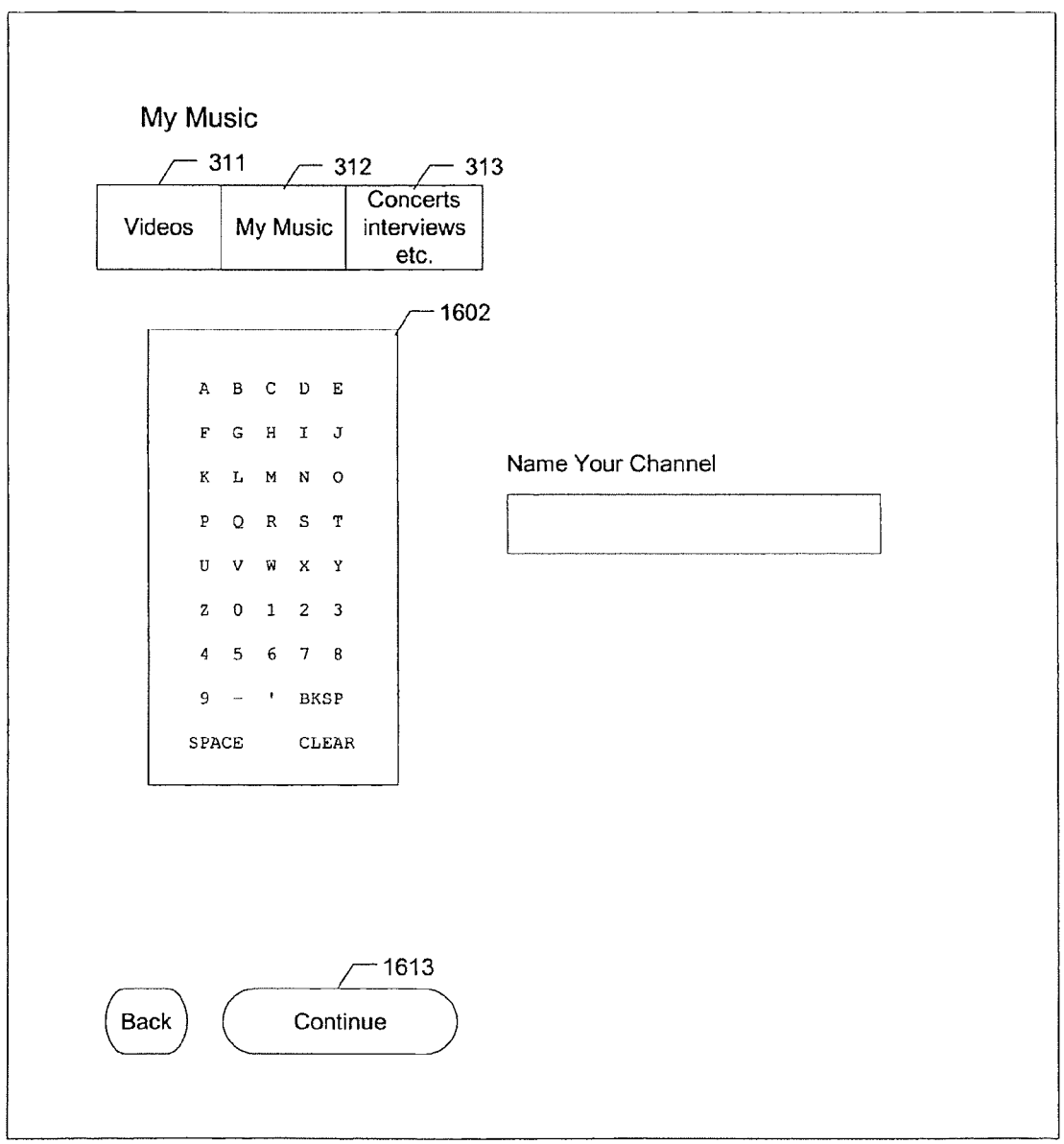

In step 1146, client system 110 displays to the user 101 a user interface that enables the user 101 to set a name for the channel. FIG. 16 illustrates a user interface 1600 that may be displayed in step 1148. As shown in FIG. 16, the user interface includes a keypad 1602. The user 101 may name a channel by selecting characters (letters, numbers, etc) from keypad 1602 using the remote control. When the user 101 is finished setting the name for the channel, the user 101 may activate continue button 1613. After step 1146, control may pass back to step 1107 or to step 1113.

Figure 17:
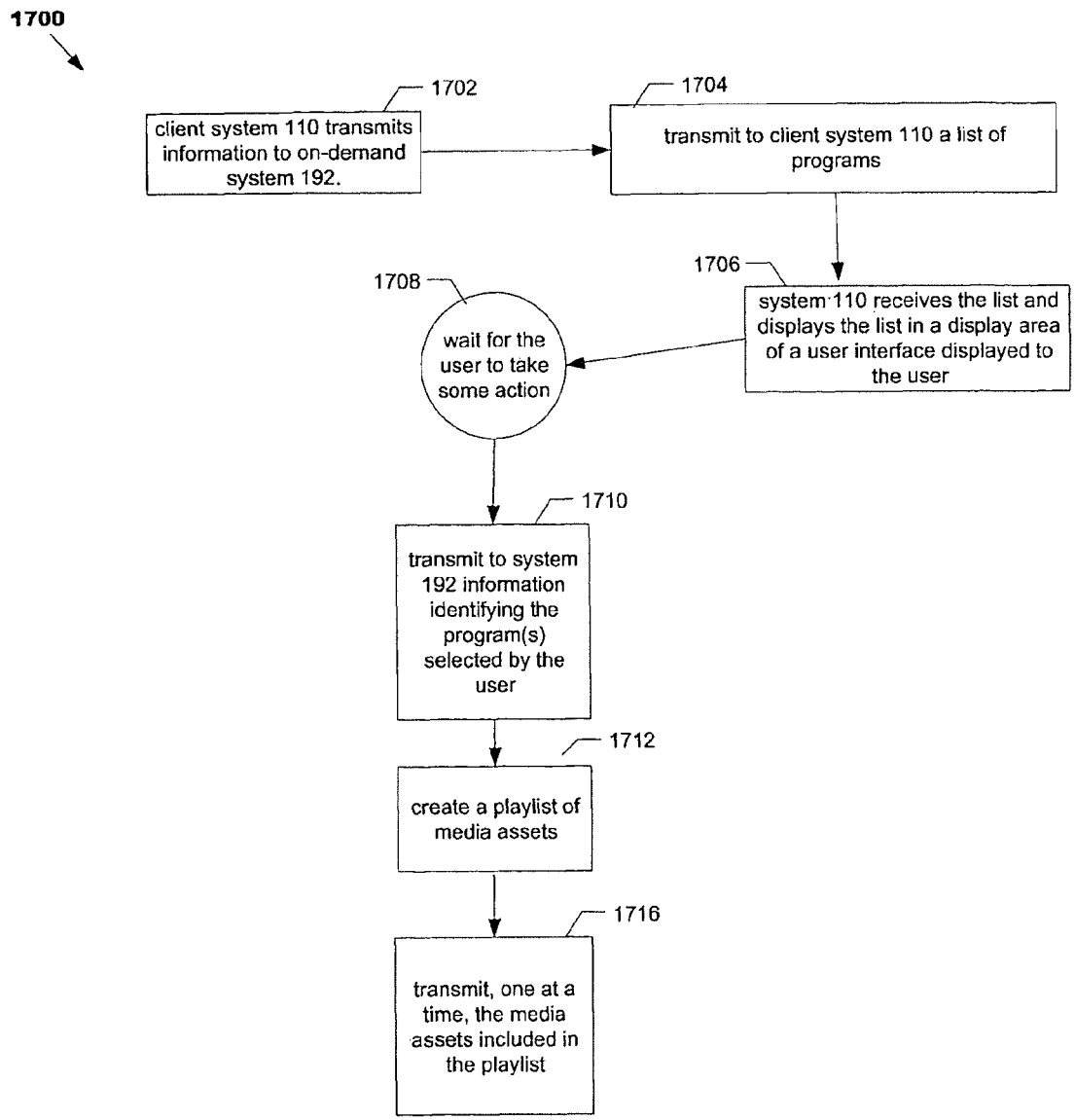
FIG. 17 is a flow chart illustrating a process according to an embodiment of the invention.

Referring back to FIG. 3, a user 101 who wishes to watch a previously recorded program can do so by activating button 313. Referring now to FIG. 17, FIG. 17 is a flow chart illustrating a process 1700, according to some embodiments, performed in response to a user 101 activating button 313. Process 1700 may begin in step 1702. In step 1702, client system 110 transmits information to on-demand system 192. The information may include information indicating that the user 101 activated button 313.

In step 1704, on-demand system 192 transmits to client system 110 a list of pre-recorded programs that are included in the media asset collection 412. The pre-recorded programs may included pre-recorded concerts, interviews, other music related programs, etc. Along with the set of program titles, on-demand system 192 may also transmit to client system 110 information regarding each program, such as a short description of the program.

Figure 18:
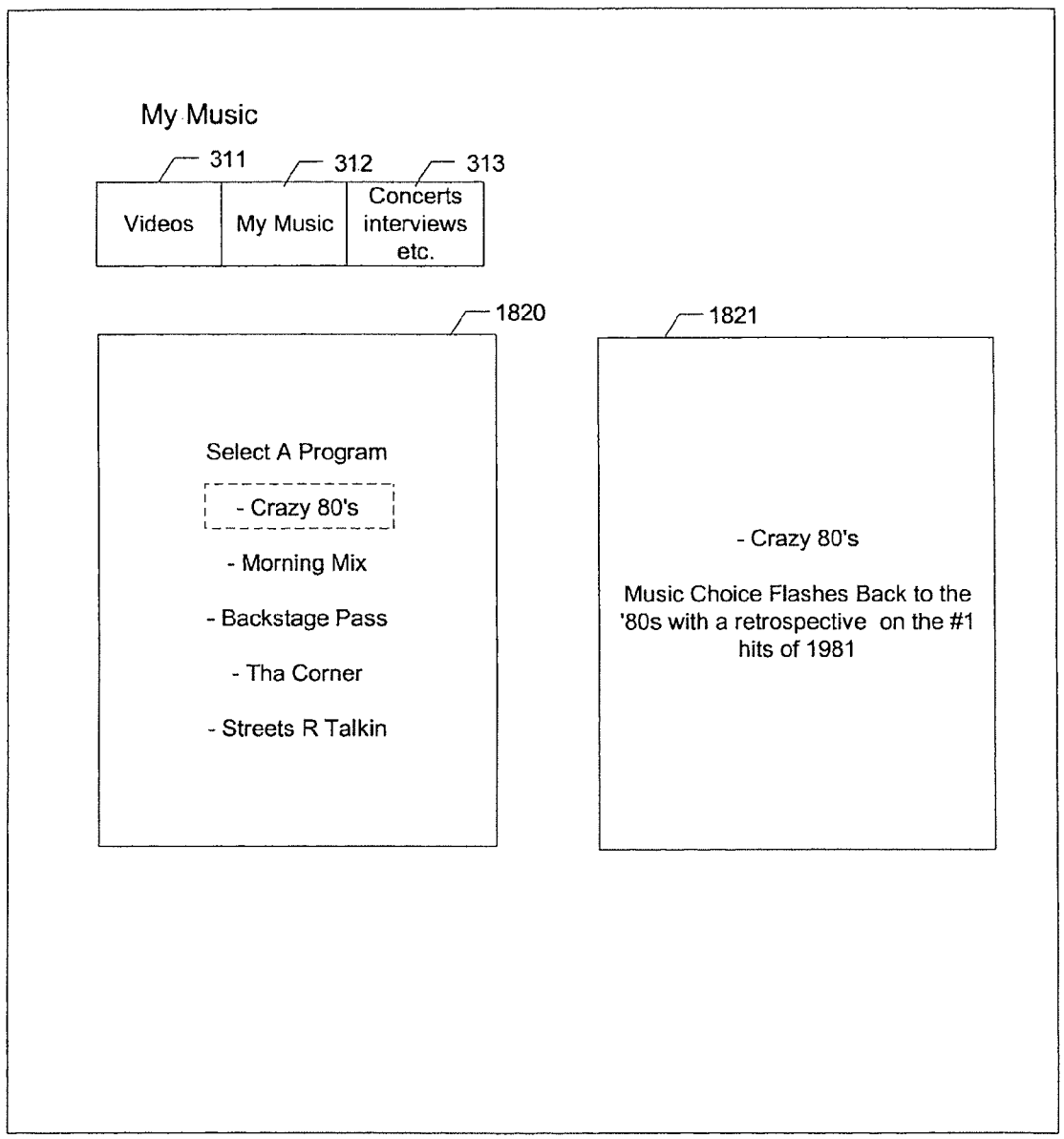
FIG. 18 illustrates an example user interface.

In step 1706, client system 110 receives the set of program titles and displays the them in a display area of a user interface displayed to the user 101. FIG. 18 illustrates an exemplary user interface 1800 that may be displayed in step 1706. Referring now to FIG. 18, user interface 1800 includes a display area 1820 for displaying the list of program titles received from on-demand system 192.

In step 1708, client system 110 waits for the user 101 to take some action. For example, the user 101 may select to view one or more of the listed programs. To do this, the user 101 may highlight one or more of the listed program titles and then activate a button on a remote control (not shown) that communicates with client system 110. In response to the user 101 highlighting one of the displayed program titles, client system 110 may display in a display area 1821 of user interface 1800 information pertaining to the selected program, such as a short description of the program. If the user 101 selects to view one or more of the listed programs then control may pass to step 1710.

In step 1710, client system 110 transmits to on-demand system 192 information identifying the program(s) selected by the user 101. In step 1712, system 192 creates a playlist of media assets (FIG. 7 illustrates a process for creating the playlist). That is, system 192 determines the media assets that it will transmit to client system 110 in response to receiving from client system 110 the information identifying the program(s) selected by the user 101. Preferably, the playlist includes the program(s) selected by the user 101 and one or more other media assets. For example, the playlist may include one or more short advertisements in addition to the program(s) selected by the user 101.

In some embodiments, a program may be divided into two or more segments. Each segment may be media asset. In these embodiments, on-demand system 192 may create a playlist wherein an advertisement(s) or other media asset(s) is/are positioned between two segments of the program. The advertisement or other media asset may be selected based on one or more criteria. As an example, advertisements can be selected based on the broadcast channel to which the user 101's client system was last tuned. Additionally, information about the user 101 can influence the selection of an advertisement. Such information about the user 101, which may be stored, in user 101 data 418, includes the user 101's age, sex, location, listening/viewing history and advertisements the user 101 has already seen.

Figure 19:
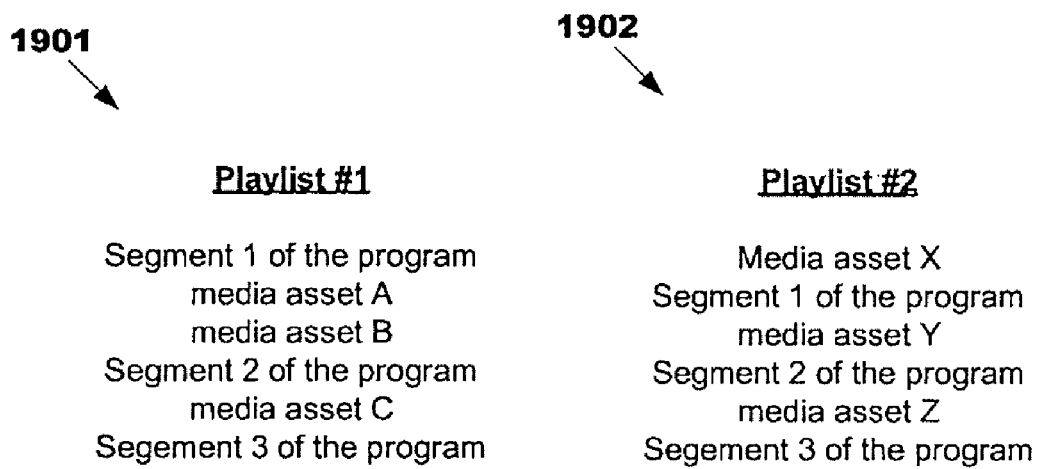
FIG. 19 illustrates example playlists.

Thus, in many embodiments, if two different users select the same program, at the same time or at different times, on-demand system 192 may create one playlist for the first user 101 and a different playlist for the second user 101, where the first playlist is tailored to the first user 101 and the second playlist is tailored to the second user 101. So, even if two users select the same program, the users may have a different viewing experience. As a specific example, if the first user 101 is under the age of 20 and the second user 101 if over the age of 30, then the advertisements, if any, included in the playlist for the first user 101 may be different than the advertisements, if any, included in the playlist for the second user 101. This feature is illustrated in FIG. 19, which shows two exemplary playlists 1901 and 1902, one for a first user 101 and one for a second user 101, where both users selected the same program, which program, in this example, was divided into three segments.

In step 1716, media server 402 transmits (e.g., by streaming) one at a time the media assets included in the playlist. Preferably, the media assets are transmitted in playlist order. In this way, when a user 101 selects to watch a program, the user 101 may first see a short advertisement, then a segment of the selected program, then another short advertisement, etc.

Referring back to FIG. 3, a user 101 who wishes to hot link from a broadcast audio channel to video-on-demand video can do so by activating button 314. Although button 314 is shown as a distinct button, in some embodiments, button 314 may simply be a hotspot over display element 302 or 304, for example.

Figure 20:
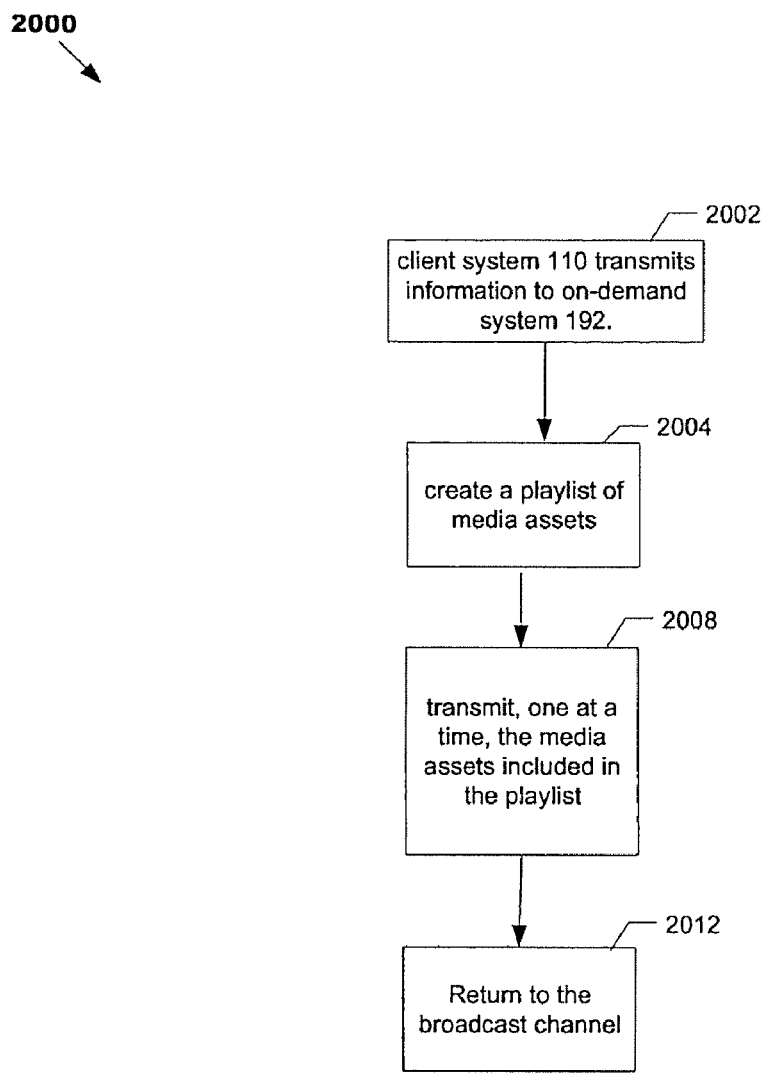
FIG. 20 is a flow chart illustrating a process according to an embodiment of the invention.

Referring now to FIG. 20, FIG. 20 is a flow chart illustrating a process 2000, according to some embodiments, performed in response to a user 101 activating button 314.

Process 2000 may begin in step 2002. In step 2002, client system 110 transmits information to on-demand system 192. The information may include information indicating that the user 101 activated button 314. Preferably, the information also includes a video identifier that identifies a video. Preferably, the identified video is related to the content of the broadcast channel to which client system 110 was tuned when the user 101 activated the button 314. For example, if the content on the broadcast channel is from Artist X, then the identified video may be a music video from Artist X.

In step 2004, system 192 creates a playlist of media assets. That is, system 192 determines the media assets that it will transmit to client system 110 in response to receiving from client system 110 the music video identifier. Preferably, the playlist includes the identified video and zero or more other media assets. For example, the playlist may include one or more short advertisements in addition to the identified video.

In step 2008, media server 402 transmits (e.g., by streaming) one at a time the media assets included in the playlist. Preferably, the media assets are transmitted in playlist order. In step 2012, the client system 110 returns (i.e., tunes) to the broadcast channel to which it was tuned when the user 101 activated button 314.

In some embodiments, it is not necessary for a user 101 to first configure client system 110 to "tune" to a broadcast media channel before user 101 can enjoy the services of on-demand system 192. For example, in some embodiments, user 101 can cause client system 110 to communicate with on-demand system 192 at any time by, for example, activating a pre-defined button on the remote control or control panel.

For example, the user 101 may at any time cause client system 110 to send a message to on-demand system indicating that the user 101 would like to see a menu of on-demand services. In response, on-demand system 192 may respond by transmitting to client system 110 information regarding the available on-demand services.

Figure 22:
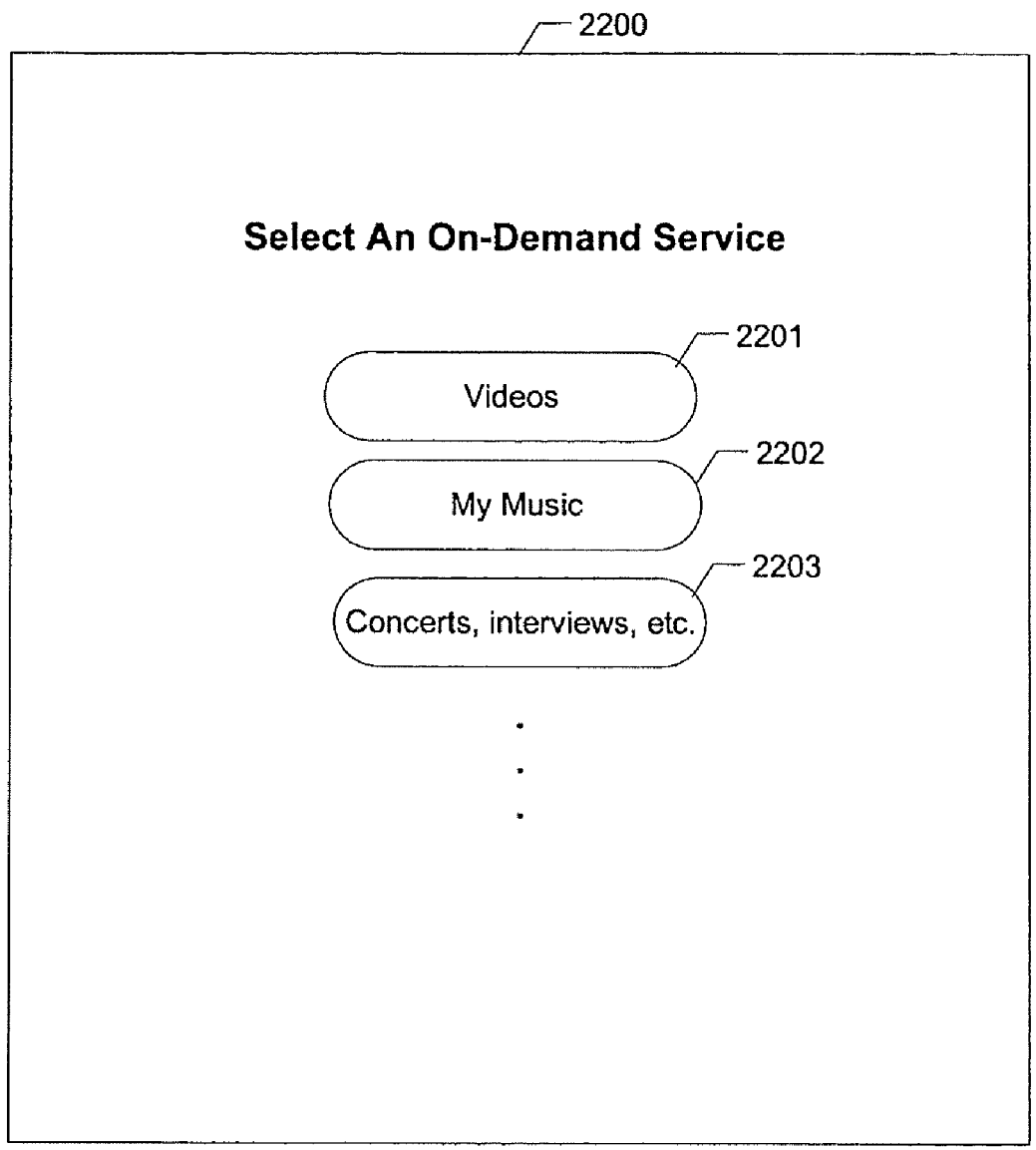

Client system 110 may then display a user interface 2200 (see FIG. 22) that enables user 101 to select one of the available on-demand services. User interface may include buttons that when activated cause the same or substantially the same effect as activating buttons 311-314. For example, user interface 2200 may include a button 2201, which is labeled "videos", a button 2202, which is labeled "MyMusic," and a button 2203, which is labeled "concerts, interviews, etc."

After a user activates the "videos" button 2201, client system 110 may display to user 101 user interface 600, wherein a list of music formats (e.g., rock, alternative, jazz, etc.) is displayed in display area 620. Client system 110 enables user to select one of the listed formats. After the user 101 selects a format, client system 110 may communicate the selection to on-demand system 192 and subsequently receive from on-demand system 192 a list of artists associated with the format (see step 544 of process 500). That is, process 500 may be performed at this point beginning with step 544. After the user activates the "MyMusic" button 2202, process 1100 may be performed. Similarly, after the user activates button 2203 process 1700 may be performed.

Figure 21:
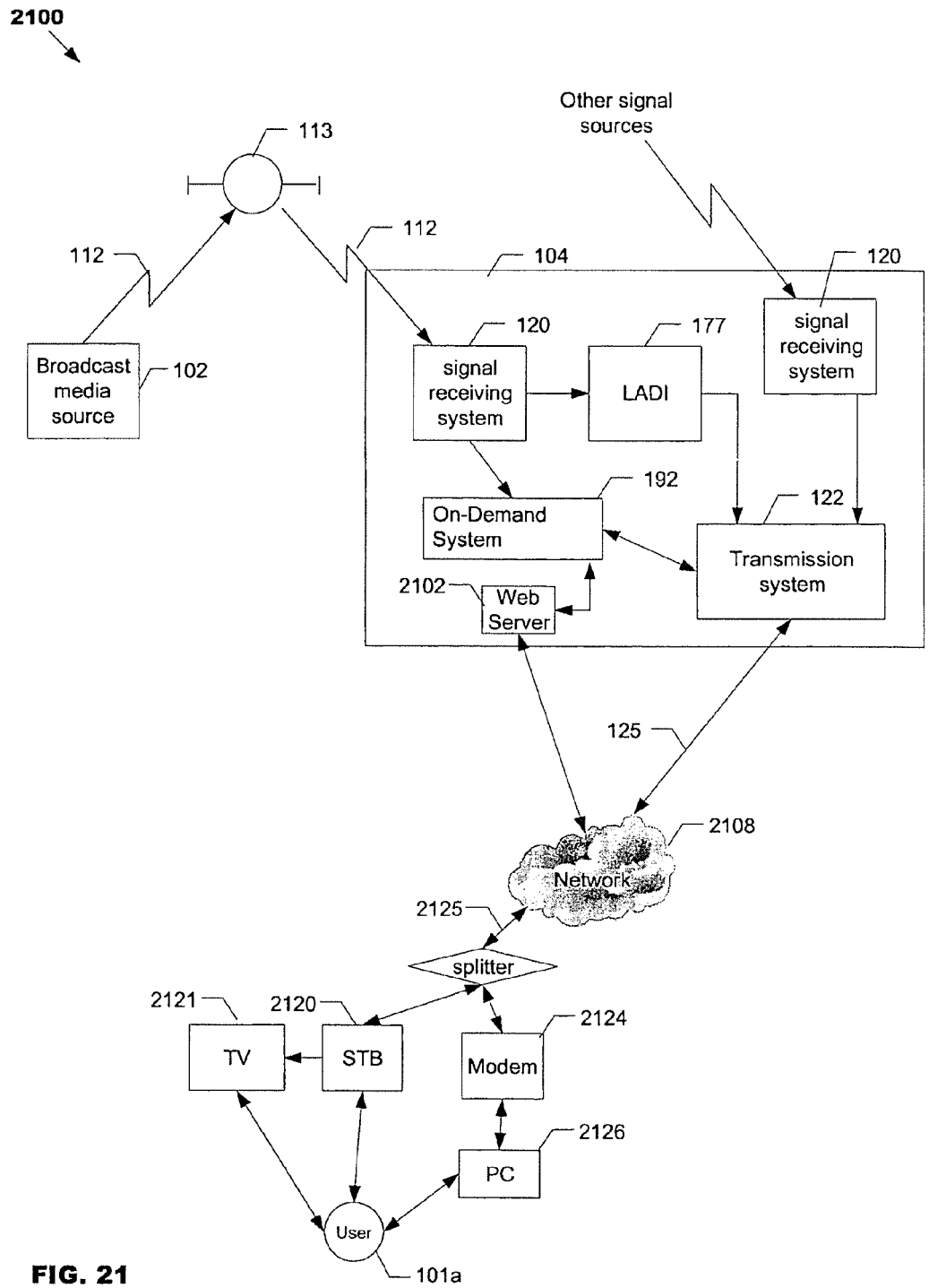
FIG. 21 is a block diagram of a system for providing both an on-demand, personalized media service and a broadcast service to a plurality of users.

Referring now to FIG. 21, FIG. 21 illustrates another embodiment of the present invention. FIG. 21 is a block diagram of a system 2100 for providing both an on-demand, personalized media service and a broadcast service to users 101. System 2100 includes many of the same components as system 100. In system 2100, user 101 interacts with a set-top-box (STB) 2120 coupled to a conventional television (TV). STB 2120 has the functionality of client system 110 described above.

User 101 also interacts with a personal computer (PC) 2126, which is coupled to a modem 2124, which may be a conventional cable modem. As used herein, the term "personal computer" should be construed broadly to include any computing system capable of executing application software, such as a web browser or a media player or other applications. Preferably modem 2124 and STB 2120 share a cable 2125 to connect to network 2108, which may be a cable-tv (CATV) network. In this embodiment, user 101 can have personalized channels transmitted to either of STB 2120 and PC 2126.

PC 2126 preferably includes a web browser program and media player. The web browser and media player may communicate with a web server 2102. For example, in response to a user 101 action, the web browser or media player may send a request to web server 2102. In response, web server 2102 may determine the personalized channel profiles 411 that are associated with the user 101 and transmit the names of the personalized channels to PC 2126, which then displays the names on a display device of the PC. The user 101 can then select one the personalized channels. In response, PC 2126 transmits the selection to web server 2120. On-demand system 192 will then start streaming to PC 2126 media based on the channel selected by the user 101. Accordingly, the same channel profile 411 can be used to stream personalized media to STB 2120 or PC 2126.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the processes described above and illustrated in the drawings are shown as a sequence of steps, this was done solely for the sake of illustration. Accordingly, unless indicated otherwise, the steps need not be performed in the order shown. Further, it is contemplated that some steps may be added and other steps omitted.

The invention claimed is:

1. A system for providing an on-demand, personalized media service and a broadcast service to a client system, comprising:
    a distribution network; and
    a distribution center including:
        (1) a signal receiver system that receives a broadcast signal transmitted from a broadcast media source, said broadcast signal including plurality of broadcast media channels,
        (2) an on-demand system, and
        (3) a transmission system that takes output from the on-demand system and output from the signal receiver system and transmits the outputs to the client system via the distribution network, wherein
    the output from the signal receiving system includes the plurality of broadcast media channels,
    the client system is operable to:
        (1) isolate at least one of the broadcast media channels,
        (2) provide audio data included in the isolated channel to an audio system that reproduces the audio for a user of the client system to hear,
        (3) provide video and/or graphical data included in the isolated channel to a video system that displays the video and/or graphical data on a display device for the user to see,
        (4) display a user selectable element on the display device so that the first user selectable element is displayed on the display device together with the video and/or graphical data obtained from the isolated channel, and
        (5) in response to the user of the client system selecting the selectable element, transmit a message to the on-demand system to initiate an on-demand session, wherein the message comprises meta information associated with the user selectable element, and
    the on-demand system is configured such that, in response to receiving a message transmitted from the client system where the message comprises meta information associated with the user selectable element, the on-demand system (a) uses the meta information to select an asset, (b) establishes an on-demand session with the client system and (c) transmits the selected asset to the client system as part of the on-demand session.

2. The system of claim 1, wherein the plurality of broadcast media channels comprises a set of digital music channels.

3. The system of claim 1, wherein the meta information includes information identifying a broadcast media channel.

4. The system of claim 1, wherein the audio data is associated with an artist and music format, and the meta information comprises information for identifying the artist and/or music format.

5. The system of claim 1, wherein the user selectable element is a distinct button.

6. The system of claim 1, wherein the user selectable element is a hotspot over a display element.

7. The system of claim 1, wherein the asset is a music video and the on-demand system is configured such that it transmits the selected asset to the client system by streaming the asset to the client system.

8. The system of claim 1, wherein the on-demand system is configured such that, in response to receiving the message transmitted from the client system, the on-demand system transmits not only the selected asset to the client system, but also transmits another selected asset to the client system as part of the on-demand session.

9. The system of claim 8, wherein the on-demand system is configured to select the another selected asset by interpreting one or more scripts.

10. The system of claim 8, wherein the another selected asset is selected based, at least in part, on a profile associated with the user.

11. A method for providing an on-demand service, comprising:
   (a) receiving a broadcast signal at a distribution center, the broadcast signal including a broadcast media channel;
   (b) transmitting from the distribution center to a client system via a distribution network the broadcast media channel, wherein the client system is operable to isolate the broadcast media channel and provide audio data included in the isolated channel to an audio system that reproduces the audio data for a user of the client system to hear;
   (c) transmitting from the distribution center to the client system information that causes the client system to:
      (c)(1) display a user selectable element on a display device while providing the audio data to the audio system so that the user can see the selectable element while listening to the audio data included in the isolated channel; and
      (c)(2) transmit a message to an on-demand system to initiate an on-demand session in response to the user of the client system selecting the selectable element, wherein the message comprises meta information associated with the user selectable element;
   (d) receiving the message comprising the meta information; and
   (e) in response to receiving the message, (e1) using the meta information included in the message to select an asset, (e2) establishing an on-demand session with the client system and (e3) transmitting, from the on-demand system to the client system, the selected asset as part of the on-demand session.

12. The method of claim 11, wherein the broadcast media channel is a digital music channel.

13. The method of claim 11, wherein the meta information includes information identifying the broadcast media channel.

14. The method of claim 11, wherein the audio data is associated with an artist and music format, and the meta information comprises information for identifying the artist and/or music format.

15. The method of claim 11, wherein the user selectable element is a distinct button.

16. The method of claim 11, wherein the user selectable element is a hotspot over a display element.

17. The method of claim 11, wherein the step of transmitting the asset to the client system comprises streaming the asset to the client system.

18. The method of claim 11, further comprising:
   selecting another asset; and
   transmitting the another asset to the client system as part of the on-demand session in response to receiving the message transmitted from the client system.

19. The method of claim 18, wherein the step of selecting the another asset comprises interpreting one or more scripts.

20. The method of claim 18, wherein the another selected asset is selected based, at least in part, on a profile associated with the user.

21. The method of claim 11, further comprising causing the client system to display a second selectable element.

22. The method of claim 21, further comprising:
   providing information to the client system that causes the client system to transmit to the on-demand system information indicating that the second element was selected in response to the user selecting the second element; and
   after the on-demand system receives the information indicating that the second element was selected, transmitting from the on-demand system to the client system information identifying a set of assets.

23. The method of claim 22, wherein each asset in said set is associated with a format associated with the broadcast media channel isolated by the client system when the user selected the second element.

24. The method of claim 21, further comprising:
   providing information to the client system that causes the client system to transmit to the on-demand system information indicating that the second element was selected in response to the user selecting the second element; and
   after the on-demand system receives the information indicating that the second element was selected, transmitting from the on-demand system to the client system information identifying a set of popular music videos within an area in which the client system is located.

25. The method of claim 21, further comprising:
   providing information to the client system that causes the client system to transmit to the on-demand system information indicating that the second element was selected in response to the user selecting the second element; and
   after the on-demand system receives the information indicating that the second element was selected, transmitting from the on-demand system to the client system information identifying a set of sub-categories associated with a format associated with the broadcast media channel isolated by the client system when the user selected the second element.

26. The method of claim 11, further comprising the steps of:
   providing information to the client system that causes the client system to transmit to the on-demand system information identifying the user and/or the client system in response to the user selecting the selectable element; and
   after receiving the information identifying the user and/or the client system, determining whether there is included in a set of channel profiles one or more channel profiles associated with the user and/or the client system.

* * * * *